US012200320B2

(12) United States Patent
Yoshida et al.

(10) Patent No.: US 12,200,320 B2
(45) Date of Patent: Jan. 14, 2025

(54) MOVING IMAGE DISTRIBUTION SYSTEM, MOVING IMAGE DISTRIBUTION METHOD, AND MOVING IMAGE DISTRIBUTION PROGRAM

(71) Applicant: GREE, Inc., Tokyo (JP)

(72) Inventors: Akashi Yoshida, Tokyo (JP); Aya Kurabuchi, Tokyo (JP); Justin Andrew Liao, Tokyo (JP); Yohei Abe, Tokyo (JP); Naoya Kinameri, Tokyo (JP)

(73) Assignee: GREE, INC., Tokyo (JP)

( * ) Notice: Subject to any disclaimer, the term of this patent is extended or adjusted under 35 U.S.C. 154(b) by 91 days.

(21) Appl. No.: 17/453,642

(22) Filed: Nov. 4, 2021

(65) Prior Publication Data

US 2022/0141551 A1    May 5, 2022

(30) Foreign Application Priority Data

Nov. 5, 2020    (JP) ................................ 2020-184798

(51) Int. Cl.
*H04N 21/8545*    (2011.01)
*H04N 21/2187*    (2011.01)
(Continued)

(52) U.S. Cl.
CPC ..... *H04N 21/8545* (2013.01); *H04N 21/2187* (2013.01); *H04N 21/23116* (2013.01); *H04N 21/2402* (2013.01); *G06T 13/80* (2013.01)

(58) Field of Classification Search
CPC ......... H04N 21/2743; H04N 21/23116; H04N 21/4788; H04N 21/8545; H04N 21/2402;
(Continued)

(56) References Cited

U.S. PATENT DOCUMENTS 11,082,467 B1 *   8/2021   Hartnett ............... H04N 21/437
2012/0174157 A1    7/2012   Stinson, III et al.
(Continued)

FOREIGN PATENT DOCUMENTS

EP    3993432 A1 *   5/2022   ......... H04N 21/2187
JP    2007241929 A    9/2007
(Continued)

OTHER PUBLICATIONS

Non-Final Office Action issued by USPTO in corresponding with the U.S. Appl. No. 17/005,977, mailed on May 12, 2022.
(Continued)

*Primary Examiner* — Ngoc K Vu
(74) *Attorney, Agent, or Firm* — Finnegan, Henderson, Farabow Garrett & Dunner LLP

(57) ABSTRACT

An aspect of the invention relates to a moving image distribution system. The moving image distribution system may include one or more processors. The one or more processors may execute a computer-readable command to register a distribution user that has made a registration request among a plurality of distribution users that distribute moving images including character objects generated based on their own movements, as a first co-starrable user, to select a first co-starring user from among a plurality of first co-starrable users in response to reception of a first co-starring application for co-starring with any of the plurality of first co-starrable users from a co-starring application user, and to distribute a co-starring moving image in which the co-starring application user and the first co-starring user co-star.

10 Claims, 13 Drawing Sheets

(51) Int. Cl.
*H04N 21/231* (2011.01)
*H04N 21/24* (2011.01)
*G06T 13/80* (2011.01)

(58) Field of Classification Search
CPC ..... H04N 21/2187; G06T 13/80; G06T 11/00; A63F 13/533; A63F 13/837; A63F 13/86
See application file for complete search history.

(56) References Cited

U.S. PATENT DOCUMENTS

| | | | |
|---|---|---|---|
| 2014/0012926 | A1 | 1/2014 | Narayanan et al. |
| 2014/0118474 | A1 | 5/2014 | Fluhr et al. |
| 2018/0041551 | A1* | 2/2018 | Ormseth ............. H04L 12/1822 |
| 2021/0065421 | A1 | 3/2021 | Kurabuchi |
| 2021/0204014 | A1 | 7/2021 | Kawakami et al. |
| 2021/0248803 | A1 | 8/2021 | Kojima et al. |
| 2021/0321061 | A1 | 10/2021 | Kawakami |
| 2022/0053227 | A1 | 2/2022 | Kurabuchi |
| 2022/0305383 | A1* | 9/2022 | Fuse ...................... G06F 3/0482 |

FOREIGN PATENT DOCUMENTS

| | | | | |
|---|---|---|---|---|
| JP | 2012-120098 | A | 6/2012 | |
| JP | 2015-184689 | | 10/2015 | |
| JP | 2015531107 | | 10/2015 | |
| JP | 6543403 | B1 | 7/2019 | |
| JP | 6550522 | B1 * | 7/2019 | |
| JP | 2019-198053 | | 11/2019 | |
| JP | 2020-096269 | | 6/2020 | |
| JP | 2020-099090 | A | 6/2020 | |
| JP | 2020-099096 | A | 6/2020 | |
| JP | 6832997 | B1 | 2/2021 | |
| WO | WO-2010093831 | A1 * | 8/2010 | ............. A63F 13/12 |

OTHER PUBLICATIONS

Notice of Reasons for Refusal, issued by Japan Patent Office for Japanese Application No. JP2020-184798, mailed Mar. 23, 2021 (4 pages).

Notice of Reasons for Refusal, issued by Japan Patent Office for Japanese Application No. JP2020-184798, mailed Jun. 8, 2021 (4pages).

Non-Final Office Action issued by USPTO in corresponding with the U.S. Appl. No. 17/005,977, mailed on Jan. 20, 2023.

Advisory Action issued by USPTO in corresponding with the U.S. Appl. No. 17/005,977, mailed on Apr. 25, 2023.

Yusuke Hasegawa, Virtual Idol New Age Opening Project MariA, CG World, Japan, Born Digital, Inc., Nov. 10, 2017, vol. 231, pp. 74-79.

Dwango Co., Ltd., "about Burst in [Virtual Cast]", [online], [Searched on Jul. 1, 2019], Internet <URL:https://qa.nicovideo.jp/faq/show/10740?category_id=718&site_domain=default>.

Notice of Reasons for Refusal, issued by Japan Patent Office for Japanese Application No. JP 2019-157445, mailed Oct. 20, 2020. (4 pages).

Notice of Reason for Refusal issued by Japanese Patent Office in corresponding with the Japanese Application No. 2021-014695, mailed Jul. 18, 2023. (4 pages).

Non-Final Office Action issued by the USPTO in U.S. Appl. No. 17/005,977, mailed Jun. 26, 2023 (51 pages).

Final Office Action issued by the USPTO in U.S. Appl. No. 17/005,977, mailed Jan. 12, 2024 (52 pages).

Non-Final Office Action issued by USPTO in U.S. Appl. No. 17/005,977, mailed on May 7, 2024.

* cited by examiner

USER INFORMATION

| ACCOUNT INFORMATION | REGISTRATION FLAG | CO-STARTING RECEPTION FLAG | USER ATTRIBUTE INFORMATION |
|---|---|---|---|
| USER ID | 0/1 | 0/1 | PLACE OF RESIDENCE, AGE, SEX, HOBBY, AND THE LIKE |

FIG. 3

CO-STARRING MOVING IMAGE INFORMATION

| DISTRIBUTION MOVING IMAGE IDENTIFICATION INFORMATION | DISTRIBUTION USER IDENTIFICATION INFORMATION | CO-STAR NUMBER DATA | CO-STARRING USER IDENTIFICATION INFORMATION |
|---|---|---|---|
| MOVING IMAGE ID | USER ID OF HOST USER | NUMBER OF CO-STARS | USER ID OF GUEST USER |

FIG. 4

MOVING IMAGE DISTRIBUTION SYSTEM, MOVING IMAGE DISTRIBUTION METHOD, AND MOVING IMAGE DISTRIBUTION PROGRAM

CROSS REFERENCE TO RELATED APPLICATIONS

This application claims priority to Japanese Patent Application No. 2020-184798 filed Nov. 5, 2020, the content of which is incorporated herein by reference in its entirety.

BACKGROUND

Technical Field

The invention disclosed in the specification relates to a moving image distribution system, a moving image (e.g., video) distribution method, and a moving image distribution program.

Related Art

In the related art, a moving image distribution system is known which generates the animation of a character based on the movement of a distribution user and performs the live distribution of a moving image including the animation of the character. For example, JP 2019-198053 A discloses this type of moving image distribution system. In the moving image distribution system, a user that is viewing a moving image can participate in a moving image distributed by another user using his or her own character. That is, in the moving image distribution system according to the related art, the characters of two or more distribution users can virtually co-star (e.g., collaborate, appear together, co-act) in the moving image. The co-starring function of the moving image distribution system is disclosed in, for example, JP 2020-096269 A. In the moving image distribution system having the co-starring function according to the related art, a user transmits a request to co-star in a moving image distributed by another user. When the co-starring request is permitted, a co-starring moving image including the characters of the user that has made the co-starring request and the user that has permitted the co-starring request is generated. Then, the co-starring moving image is distributed to a viewing user.

SUMMARY

In a case in which two or more users co-star in the moving image distribution system according to the related art, the user that applies for co-starring needs to select a moving image which is a participation destination from a large number of moving images being distributed or to search for a co-starring partner from a large number of distribution users. In addition, there is concern that, even when a moving image or a co-starring partner is specified and a co-starring application is made, the co-starring application will not be permitted and co-starring will not be realized, or it will take a long time until the co-starring application is permitted.

As described above, a technical improvement for promoting the use of the co-starring function is required in the moving image distribution system according to the related art in which the users that distribute moving images including the character objects generated based on their own movements can co-star.

An object of the invention is to provide a technical improvement that solves or reduces at least some of the above-mentioned problems of the related art. One of the more specific objects of the invention is to provide a technical improvement for promoting co-starring of users that distribute moving images including character objects generated based on their own movements. The other objects of the invention will become apparent by reference to the entire specification.

An aspect of the invention relates to a moving image distribution system. In an aspect of the invention, the moving image distribution system includes one or more processors. In an aspect of the invention, the one or more processors execute a computer-readable command to register a distribution user that has made a registration request among a plurality of distribution users, that distribute moving images including character objects generated based on their own movements, as a first co-starrable user, to select a first co-starring user from among a plurality of first co-starrable users in response to reception of a first co-starring application for co-starring with any of the plurality of first co-starrable users from a co-starring application user, and to distribute a co-starring moving image in which the co-starring application user and the first co-starring user co-star.

In an aspect of the invention, the co-starring moving image is distributed without getting permission of the first co-starring user after the first co-starring application is received.

In an aspect of the invention, the first co-starring application is received both while the co-starring application user is viewing the moving image of the first co-starring user and while the co-starring application user is not viewing the moving image of the first co-starring user.

In an aspect of the invention, an upper limit of the number of users able to co-star is set for each of the plurality of distribution users.

In the moving image distribution system according to an aspect of the invention, the number of co-starrable users represented by a difference between the upper limit and the number of users that are co-starring is managed for each of the plurality of distribution users, and the first co-starring user is selected based on the number of users able to co-star for each of the plurality of distribution users.

In an aspect of the invention, attribute information indicating an attribute of each of the plurality of distribution users is set for each of the plurality of distribution users, and the first co-starring user is selected based on at least the attribute information about the first co-starrable user.

In the moving image distribution system according to an aspect of the invention, determination is made whether or not the co-starring application user and a second co-starring user selected from among the plurality of distribution users are able to co-star in response to reception of a second co-starring application for co-starring with the second co-starring user. In a case in which it is determined that the co-starring application user and the second co-starring user are able to co-star, another co-starring moving image in which the co-starring application user and the second co-starring user co-star is generated.

In an aspect of the invention, the second co-starring application is received only while the co-starring application user is viewing the moving image of the second co-starring user.

In an aspect of the invention, the second co-starring user is selected from one or more second co-starrable users that receive the second co-starring application among the plurality of distribution users. In the moving image distribution system according to an aspect of the invention, a co-starring list including at least one of at least some of one or more first co-starrable users and at least some of the second co-starrable users that receive the co-starring application among the plurality of distribution users is provided to the co-starring application user.

In the moving image distribution system according to an aspect of the invention, a list including at least some of the plurality of distribution users is displayed. In the list, each of the one or more first co-starrable users is displayed so as to be distinguishable from the distribution user that is not the first co-starrable user among the plurality of distribution users.

In the moving image distribution system according to an aspect of the invention, a user that has started a game in which at least some of the plurality of distribution users participate is registered as the first co-starrable user.

Another aspect of the invention relates to a moving image distribution method performed by execution of one or computer-readable commands by one or more computer processors. The moving image distribution method according to an aspect of the invention includes: a step of registering a distribution user that has made a registration request among a plurality of distribution users, that distribute moving images including character objects generated based on their own movements, as a first co-starrable user; a step of selecting a first co-starring user from the first co-starrable users in response to reception of a first co-starring application for co-starring with any of the first co-starrable users from a co-starring application user; and a step of generating a co-starring moving image in which the co-starring application user and the first co-starring user co-star.

Still another aspect of the invention relates to a moving image distribution program. The moving image distribution program according to an aspect of the invention causes one or more computer processors to perform: a step of registering a distribution user that has made a registration request among a plurality of distribution users, that distribute moving images including character objects generated based on their own movements, as a first co-starrable user; a step of selecting a first co-starring user from the first co-starrable users in response to reception of a first co-starring application for co-starring with any of the first co-starrable users from a co-starring application user; and a step of generating a co-starring moving image in which the co-starring application user and the first co-starring user co-star.

According to an embodiment of the invention, it is possible to promote co-starring of users that distribute moving images including character objects generated based on their own movements.

BRIEF DESCRIPTION OF DRAWINGS

FIG. 3 is a diagram illustrating user information stored in the moving image distribution system illustrated in FIG. 1;

FIG. 4 is a diagram illustrating co-starring moving image information stored in the moving image distribution system illustrated in FIG. 1;

DETAILED DESCRIPTION

Figure 1:
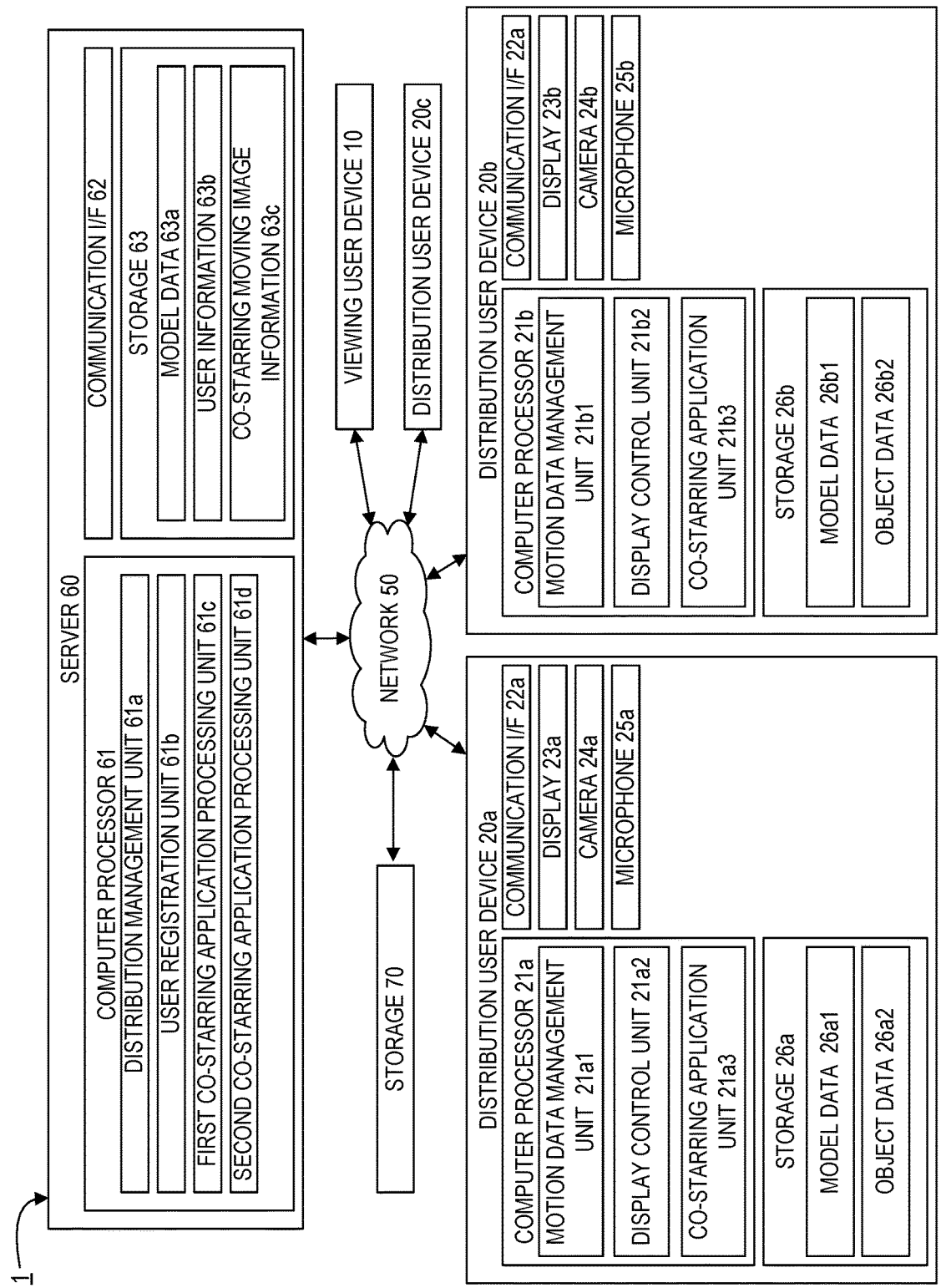
FIG. 1 is a block diagram illustrating a moving image distribution system according to an embodiment.

Hereinafter, various embodiments of the invention will be described with reference to the drawings. In a plurality of drawings, the same or similar components may be denoted by the same reference numerals. As used herein, unless specifically stated otherwise, the term "or" encompasses all possible combinations, except where infeasible. For example, if it is stated that a component includes A or B, then, unless specifically stated otherwise or infeasible, the component may include A, or B, or A and B. As another example, if it is stated that a component includes A, B, or C, then unless specifically stated otherwise or infeasible, the component may include A, or B, or C, or A and B, or A and C, or B and C, or A and B and C. Expressions such as "at least one of" do not necessarily modify the entirety of a following list and do not necessarily modify each member of the list, such that "at least one of A, B, and C" should be understood as including only one of A, only one of B, only one of C, or any combination of A, B, and C. The phrase "one of A and B" or "any one of A and B" shall be interpreted in the broadest sense to include one of A or one of B.

Figure 2:
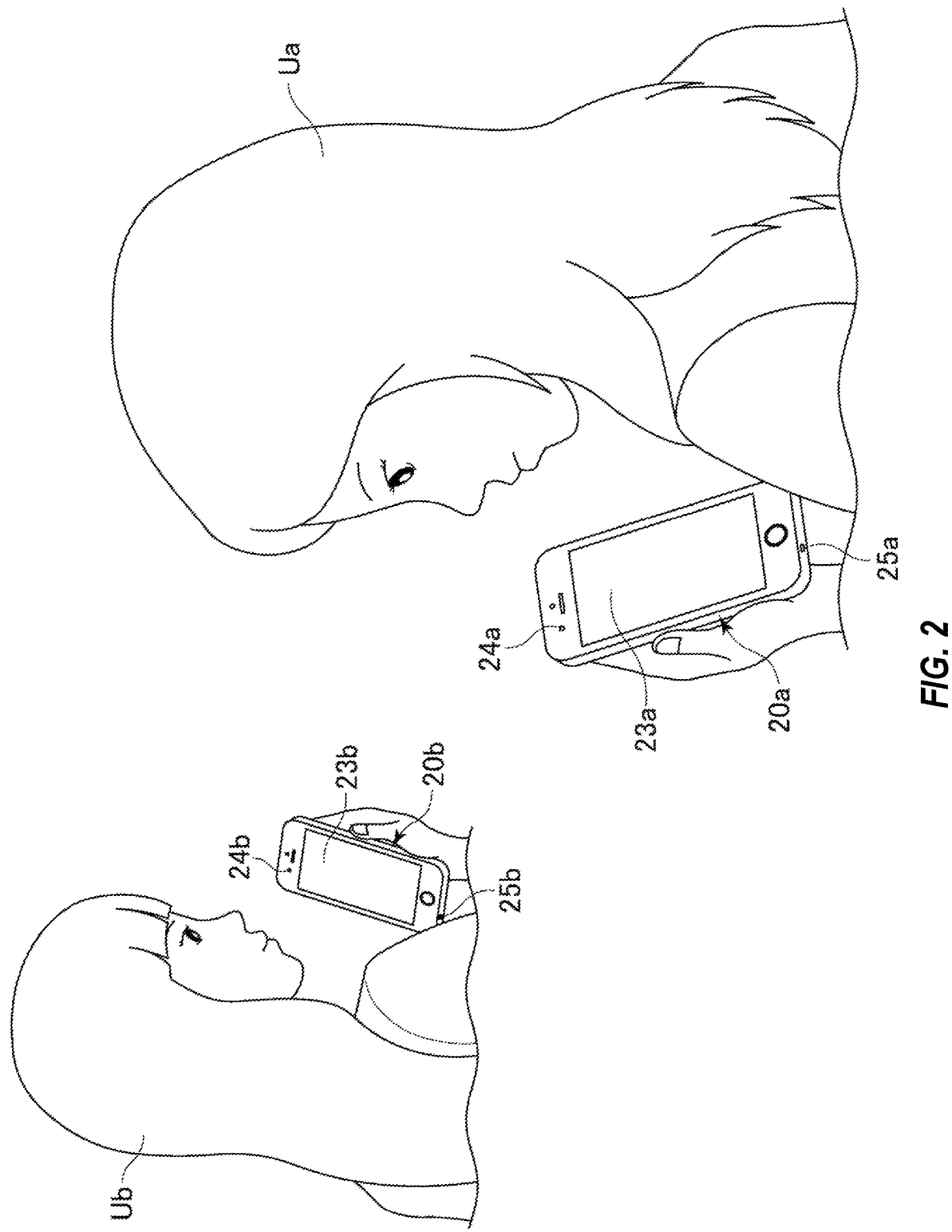
FIG. 2 is a diagram schematically illustrating a distribution user that distributes a moving image distributed by the moving image distribution system illustrated in FIG. 1 and a distribution user device used by the distribution user.

A moving image distribution system according to an embodiment will be described with reference to FIGS. 1 to 5. First, the outline of a moving image distribution system 1 according to an embodiment will be described with reference to FIGS. 1 and 2. FIG. 1 is a block diagram illustrating the moving image distribution system 1 according to the embodiment, and FIG. 2 is a diagram schematically illustrating users Ua and Ub that distribute moving images and distribution user devices 20a and 20b which are used by the users Ua and Ub, respectively, in the moving image distribution system 1. The distribution user device 20a has a function of distributing a moving image including a character object generated based on the movement of the user Ua in the moving image distribution system 1, and the distribution user device 20b has a function of distributing a moving image including a character object generated based on the movement of the user Ub in the moving image distribution system 1. For simplicity of explanation, FIG. 2 illustrates only two users (users Ua and Ub) and the distribution user devices 20*a* and 20*b* used by the two users. However, in the moving image distribution system 1, three or more users may distribute moving images including character objects generated based on the movement of each user using each distribution user device. FIG. 1 illustrates a distribution user device 20*c* of a distribution user Uc in addition to the distribution user devices 20*a* and 20*b*. Since the distribution user device 20*c* has the same functions as the distribution user devices 20*a* and 20*b*, the detailed description thereof will not be repeated. In the specification, in a case in which a "distribution user device" is simply referred to without a reference numeral, the "distribution user device" can have the same functions as the distribution user devices 20*a* and 20*b*.

The moving image distribution system 1 can generate a co-starring moving image including the character objects of two or more distribution users, which will be described in detail below. In other words, in the moving image distribution system 1, two or more users can virtually co-star in the moving image through their character objects. As described above, in a case in which two or more users virtually co-star in the moving image through their character objects, the moving image is referred to as a co-starring moving image. In the moving image distribution system 1, each user that distributes a moving image can apply for co-starring with other users. For example, the user Ua can apply for co-starring with the user Ub or other users. On the contrary, the user Ub can also apply for co-starring with the user Ua or other users. A co-starring moving image including the character object of the user that has applied for co-starring and the character object of the user that has received the co-starring application is generated based on the co-starring application.

In a case in which a user applies for co-starring with another user and two or more users co-star in a moving image, the user that applies for co-starring may be referred to as a "guest user". In addition, the user that originally distributes the moving image and receives the application for co-starring in the moving image may be referred to as a "host user". The concept of the host user and the guest user is relative. For example, in a case in which the user Ub applies for co-starring with the user Ua, the user Ua is the host user, and the user Ub is the guest user. On the contrary, in a case in which the user Ua applies for co-starring with the user Ub, the user Ua is the guest user, and the user Ub is the host user.

Both the user Ua and the user Ub may be distribution users that distribute moving images including character objects generated based on their own movements and are also viewing users that view the moving images of other distribution users. Therefore, the distribution user devices 20*a* and 20*b* may have a function of viewing the moving images distributed by the moving image distribution system 1.

It is assumed that the moving image distribution system 1 is used by a large number of users. The users of the moving image distribution system 1 include a distribution user that distributes a moving image and a viewing user that views the distributed moving image. The users of the moving image distribution system 1 are divided into the distribution users and the viewing users according to the usage aspect of the moving image distribution system 1. However, one user may be the distribution user or the viewing user according to the usage aspect of the moving image distribution system 1. For example, the distribution user that distributes the moving image using the moving image distribution system 1 can view the moving image distributed by another distribution user using the moving image distribution system 1. Therefore, the user is the distribution user when distributing the moving image and is the viewing user when viewing the moving image.

In the moving image distribution system 1, it is assumed that a large number of distribution users distribute moving images. Therefore, for example, it is not easy for the distribution users Ua, Ub, and Uc to search for a co-starring partner from a large number of distribution users. For this reason, the moving image distribution system 1 according to an embodiment of the invention has a function of supporting the selection of the co-starring partner by the distribution users Ua, Ub, and Uc (and other distribution users). Specifically, the moving image distribution system 1 can have a function of receiving a co-starring application of a co-starring partner non-designation type (hereinafter, referred to as a "first co-starring application"), which does not specify or designate a co-starring partner, from the distribution user that desires to co-star with other users and selecting a user that becomes a co-starring partner co-starring with the co-starring application user that has made the first co-starring application based on the first co-starring application. In the specification, in some cases, the distribution user selected as the partner that co-stars with the co-starring application user based on the first co-starring application is referred to as a "first co-starring user". The first co-starring user is selected from the distribution users (hereinafter, referred to as "first co-starrable users") that are permitted to co-star with the co-starring application user based on the first co-starring application among a plurality of distribution users that distribute moving images using the moving image distribution system 1. As described above, the moving image distribution system 1 achieves co-starring of the co-starring application user that has made the first co-starring application and other users based on the first co-starring application that does not specify the co-starring partner, which makes it possible to achieve co-starring with other users without specifying or designating the co-starring partner. Therefore, the co-starring of the distribution users is activated.

When receiving a co-starring application (hereinafter, referred to as a "second co-starring application") that designates a co-starring partner from the co-starring application user, the moving image distribution system 1 may determine whether or not the co-starring application user and the user (hereinafter, referred to as a "second co-starring user") designated in the second co-starring application can co-star, and may achieve the co-starring of the co-starring application user and the second co-starring user in a case in which it is determined that the users can co-star. The second co-starring user is designated by the co-starring application user from the users (hereinafter, referred to as "second co-starrable users") that receive the second co-starring application from other distribution users among a plurality of distribution users that distribute moving images using the moving image distribution system 1. Therefore, the moving image distribution system 1 can achieve co-starring of the users based on the second co-starring application that designates a co-starring partner. The second co-starrable user may overlap the first co-starrable user. That is, a certain distribution user may be the first co-starrable user and the second co-starrable user.

All of the co-starring application user, the first co-starrable user, the second co-starrable user, the first co-starring user, and the second co-starring user are included in the distribution users that distribute the moving images including the character objects generated based on their own movements in the moving image distribution system 1.

Next, the architecture of the moving image distribution system 1 and the outline of the devices constituting the moving image distribution system 1 will be described, and then the functions of each device will be described. In the description of the functions of each of the devices, a function or process for co-starring with the first co-starring user and the second co-starring user will be described in detail.

The moving image distribution system 1 includes a viewing user device 10, the distribution user devices 20*a*, 20*b*, and 20*c*, a server 60, and a storage 70. The viewing user device 10, the distribution user devices 20*a*, 20*b*, and 20*c*, the server 60, and the storage 70 are connected to each other through a network 50 such that they can communicate with each other. The server 60 is configured to distribute moving images including the animations of the character objects of the distribution users Ua, Ub, and Uc and other distribution users, which will be described below. The server 60 may be configured to distribute moving images other than the moving images including the animations of the character objects. In addition to the moving image distribution service, the server 60 may provide a social networking service for users to interact with each other or a platform function for the social networking service.

In the moving image distribution system 1, the moving images are distributed from the server 60 to the viewing user device 10 and the distribution user devices 20*a*, 20*b*, and 20*c*. The distributed moving image is displayed on a display of the viewing user device 10. The viewing user that is the user of the viewing user device 10 can view the distributed moving image using the viewing user device 10. The distribution users Ua, Ub, and Uc can view the distributed moving image and give a performance while checking the moving image that is being distributed. Only one viewing user device 10 is illustrated in FIG. 1 for simplicity of explanation. However, the moving image distribution system 1 may include a plurality of viewing user devices. In addition, only three distribution user devices are illustrated in FIG. 1. However, as described above, the moving image distribution system 1 may include four or more distribution user devices. Further, as described above, the distribution users Ua, Ub, and Uc are also the viewing users. Therefore, in a case in which the users do not distribute their own moving images, the users can view the moving images distributed by other distribution users using the distribution user devices 20*a*, 20*b*, and 20*c*.

In the embodiment illustrated in the drawings, the distribution user device 20*a* includes a computer processor 21*a*, a communication I/F 22*a*, a display 23*a*, a camera 24*a*, a microphone 25*a*, and a storage 26*a*. Similarly, the distribution user device 20*b* includes a computer processor 21*b*, a communication I/F 22*b*, a display 23*b*, a camera 24*b*, a microphone 25*b*, and a storage 26*b*. Since the distribution user device 20*a* and the distribution user device 20*b* have the same configuration and functions, the distribution user device 20*c*, which is not illustrated, has the same configuration as the distribution user devices 20*a* and 20*b*. In a case in which the distribution user devices 20*a*, 20*b*, and 20*c* do not need to be distinguished from each other, the distribution user devices 20*a*, 20*b*, and 20*c* may be collectively referred to as distribution user devices 20. In this case, components thereof may be described without branch numbers "a" and "b" like computer processors 21. That is, the description of the computer processor 21 applies to both the computer processors 21*a* and 21*b* as long as there is no contradiction.

The computer processor 21 is an arithmetic unit that loads an operating system or various programs which implement various functions from a storage to a memory and executes commands included in the loaded programs. The computer processor 21 can execute commands included in a moving image application program. The computer processor 21 is, for example, a CPU, an MPU, a DSP, a GPU, various arithmetic devices other than those, or a combination thereof. The computer processor 21 may be implemented by an integrated circuit such as an ASIC, a PLD, an FPGA, or an MCU. The computer processor 21 is illustrated as a single component in FIG. 1. However, the computer processor 21 may be a set of a plurality of physically separate computer processors.

The communication I/F 22 is implemented as hardware, firmware, communication software, such as a TCP/IP driver or a PPP driver, or a combination thereof. The distribution user device 20 can transmit and receive data to and from other devices through the communication I/F 22.

The display 23 has, for example, a display panel and a touch panel. The touch panel is configured to detect a touch operation (contact operation) of a player. The touch panel can detect various touch operations of the player, such as tapping, double tapping, and dragging. The touch panel may include a capacitive proximity sensor and may be configured to detect a non-contact operation of the player.

The camera 24 continuously images the face of the distribution user Ua or Ub to acquire image data of the face of the distribution user Ua or Ub. The image data of the face of the distribution user Ua or Ub captured by the camera 24 is transmitted to the server 60 through the communication I/F 22. The camera 24 may be a 3D camera that can detect the depth of the face of the distribution user. The camera 24 may image parts other than the face of the distribution user Ua or Ub, such as a hand, a leg, fingers of the hand, or parts other than those, to acquire imaging data.

The microphone 25 is a sound collection device that is configured to convert input voice into voice data. The microphone 25 is configured to acquire the voice input from the distribution user Ua or Ub. The voice input from the distribution user Ua or Ub acquired by the microphone 25 is converted into voice data, and the voice data is transmitted to the server 60 through the communication I/F 22.

The storage 26 is a storage device that is accessed by the computer processor 21. The storage 26 is, for example, a magnetic disk, an optical disk, a semiconductor memory, or various storage devices capable of storing data other than those. Various programs can be stored in the storage 26. At least some of the programs and various kinds of data that can be stored in the storage 26 may be stored in a storage (for example, the storage 70) that is physically separate from the distribution user device 20.

The storage 26*a* may store model data 26*a*1 and object data 26*a*2. The storage 26*b* may store model data 26*b*1 and object data 26*b*2. The model data 26*a*1 and the model data 26*b*1 are model data for generating the character (avatar) objects of the distribution users Ua and Ub, respectively. Each of the model data 26*a*1 and the model data 26*b*1 includes, for example, rig data (referred to as "skeleton data" in some cases) indicating the skeleton of the face of the character and parts other than the face and surface data indicating the shape and texture of the surface of the character. In some cases, the surface data is referred to as skin data. The model data 26*a*1 may be acquired from the server 60 in response to the start of the moving image application program in the distribution user device 20*a*. The model data 26*b*1 may be acquired from the server 60 in response to the start of the moving image application program in the distribution user device 20*b*.

Each of the object data 26*a*2 and the object data 26*b*2 includes asset data for constructing a virtual space. Each of the object data 26*a*2 and the object data 26*b*2 includes data for drawing the background of a virtual space constituting the moving image, data for drawing various objects displayed in the moving image, and data for drawing various objects displayed in other moving images. Each of the object data 26*a*2 and the object data 26*b*2 may include object position information indicating the position of the object in the virtual space.

The viewing user device 10 may include the same components as the distribution user device 20. For example, the viewing user device 10 may include a computer processor, a communication I/F, a display, and a camera. The viewing user device 10 may have the same function as the distribution user device 20 by downloading and installing the moving image application program.

The viewing user device 10 and the distribution user device 20 are information processing devices such as smart phones. The viewing user device 10 and the distribution user device 20 may be mobile phones, tablet terminals, personal computers, electronic book readers, wearable computers, game consoles, and various information processing devices capable of playing back moving images other than those, in addition to the smart phones. Each of the viewing user device 10 and the distribution user device 20 may include a sensor unit that includes various sensors, such as gyro sensors, and a storage that stores various kinds of information in addition to the above-mentioned components.

Next, the server 60 will be described. In the embodiment illustrated in the drawings, the server 60 includes a computer processor 61, a communication I/F 62, and a storage 63.

The computer processor 61 is an arithmetic unit that loads the operating system or various programs which implement various functions from the storage 63 or other storages to a memory and executes commands included in the loaded programs. The computer processor 61 can execute commands included in a distribution program. The computer processor 61 is, for example, a CPU, an MPU, a DSP, a GPU, various arithmetic devices other than those, or a combination thereof. The computer processor 61 may be implemented by an integrated circuit such as an ASIC, a PLD, an FPGA, or an MCU. The computer processor 61 is illustrated as a single component in FIG. 1. However, the computer processor 61 may be a set of a plurality of physically separate computer processors.

The communication I/F 62 is implemented as hardware, firmware, communication software, such as a TCP/IP driver or a PPP driver, or a combination thereof. The server 60 can transmit and receive data to and from other devices through the communication I/F 62.

The storage 63 is a storage device that is accessed by the computer processor 61. The storage 63 is, for example, a magnetic disk, an optical disk, a semiconductor memory, or various storage devices capable of storing data other than those. Various programs can be stored in the storage 63. At least some of the programs and various kinds of data that can be stored in the storage 63 may be stored in a storage (for example, the storage 70) that is physically separate from the server 60.

In the specification, each of the programs executed by the computer processor 21 or the computer processor 61 or the commands included in the programs may be executed by a single computer processor or may be dispersedly executed by a plurality of computer processors. In addition, each of the programs executed by the computer processor 21 or the computer processor 61 or the commands included in the programs may be executed by a plurality of virtual computer processors.

Next, the data stored in the storage 63 will be described. In the embodiment illustrated in the drawings, model data 63*a*, user information 63*b*, co-starring management information 63*c*, and various kinds of data required to generate and distribute distribution moving images other than the above are stored in the storage 63.

The model data 63*a* is data for drawing the character object associated with each user in the moving image distribution system 1 and is transmitted to the distribution user device in response to a request from the distribution user device. The model data 26*a*1 and the model data 26*b*1 stored in the distribution user device 20*a* are a portion of the model data 63*a* and are data for drawing the character objects associated with the distribution users Ua and Ub, respectively. The distribution user devices 20*a* and 20*b* can acquire the model data 26*a*1 or the model data 26*b*1 corresponding to their own characters from the server 60.

An example of the user information 63*b* is illustrated in FIG. 3. As illustrated in FIG. 3, various kinds of data related to the user that uses the moving image distribution system 1 are stored as the user information 63*b* in association with account information on the user. In the example illustrated in FIG. 3, a registration flag, a co-starring reception flag, and user attribute information are stored in association with the account information on the user. The user information 63*b* may include information other than the above.

The account information on the user is, for example, user identification information (user ID) for identifying the user. The user ID may be assigned to the user when the user registers the use of the service first in the moving image distribution system 1.

As described above, the moving image distribution system 1 has a function of selecting the first co-starring user that co-stars with the co-starring application user among the first co-starrable users in response to the reception of the first co-starring application that does not designate the co-starring partner from the co-starring application user and generating a co-starring moving image in which the co-starring application user and the first co-starring user co-star. The registration flag associated with the account information on the user indicates whether or not the user is registered as the first co-starrable user. For example, in a case in which the user is not registered as the first co-starrable user, "0" may be set as the registration flag. In a case in which the user is registered as the first co-starrable user, "1" may be set as the registration flag. A user that wants to increase a chance of co-starring with other users can transmit a registration request for registration as the first co-starrable user from his or her own distribution user device to the server 60. On the contrary, a user that does not want to co-star with other users based on the first co-starring application can transmit an exclusion request for exclusion from the first co-starrable users from his or her own distribution user device to the server 60.

As described above, the distribution user that distributes a moving image using the moving image distribution system 1 can co-star with the co-starring application user based on the second co-starring application from the co-starring application user. The co-starring application user can make the second co-starring application to the second co-starrable user. The moving image distribution system 1 can set whether or not to receive co-starring by the second co-starring application from another user, that is, whether or not the user corresponds to the second co-starrable user for each user. The user information 63b may include a co-starring reception flag indicating whether or not the user is registered as the second co-starrable user. A user that does not want to receive the second co-starring application from other users can set the co-starring reception flag so as not to receive the second co-starring application from other users. The co-starring reception flag associated with the account information on the user indicates whether or not the user is registered as the second co-starrable user, that is, whether or not the user receives the second co-starring application from other users. For example, in a case in which a certain user does not want to receive the second co-starring application from other users, "0" may be set as the co-starring reception flag. In a case in which the user wants to receive the second co-starring application, "1" may be set as the co-starring reception flag. The user can operate a switching button on a setting screen to switch the co-starring reception flag.

The user attribute information associated with the account information on the user can include various kinds of attribute information about the user. For example, the user attribute information about a certain user may include various kinds of information indicating the age, sex, address, hobby, occupation, and other attributes of the user. The first co-starring user may be selected from the first co-starrable users based on the user attribute information about the co-starring application user and the first co-starrable user, as will be described below. In the user information, various kinds of information other than the above can be stored in association with the account information on the user. The moving image distribution system 1 may provide a function of grouping users. In this case, in the user information, group identification information for identifying the group, to which the user belongs, may be stored in association with the account information on the user.

Next, the co-starring management information 63c will be described with reference to FIG. 4. An example of the co-starring management information 63c is illustrated in FIG. 4. As illustrated in FIG. 4, as the co-starring management information 63c, various kinds of information for managing the co-starring of the distribution user and other distribution users are stored in association with distribution moving image identification information for identifying the moving image distributed by the distribution user. The co-starring management information 63c for a certain distribution moving image may include distribution user identification information for identifying the distribution user that distributes the distribution moving image, co-star number data indicating the number of co-stars that are co-starring in the distribution moving image, and co-starring user identification information for identifying the co-starring user.

The distribution moving image identification information for a certain distribution moving image is, for example, a moving image ID for identifying the distribution moving image. The moving image ID may be issued in order to identify the distribution moving image when the user starts to distribute the moving image. The distribution user identification information for a certain distribution moving image may be the user ID of the user that distributes the moving image. The co-starring user identification information for a certain distribution moving image may be the user ID of the co-starring user that co-stars with the distribution user in the moving image. In a case in which the moving image identified by the moving image ID is a co-starring moving image, the distribution user identification information is the user ID of the host user, and the co-starring user identification information is the user ID of the guest user.

The co-star number data for a certain distribution moving image indicates the number of co-starring users that co-star with the distribution user in the distribution moving image. In the distribution moving image, the upper limit of the number of co-starring users that can co-star with the distribution user in the distribution moving image may be set. The co-star number data is a natural number that is equal to or less than the upper limit of the number of co-starring users. The upper limit of the number of co-starring users is, for example, five. The upper limit of the number of co-starring users may not be five and may be appropriately changed. The upper limit of the number of co-starring users may be set individually for each distribution user. For example, in a case in which the upper limit of the number of co-starring users for a certain distribution user is five, the upper limit of the number of co-starring users for another distribution user may be three. The upper limit of the number of co-starring users may be set uniformly for all of the distribution users. The co-star number data is represented by a number that is equal to or less than the upper limit of the number of co-starring users.

Figure 5:
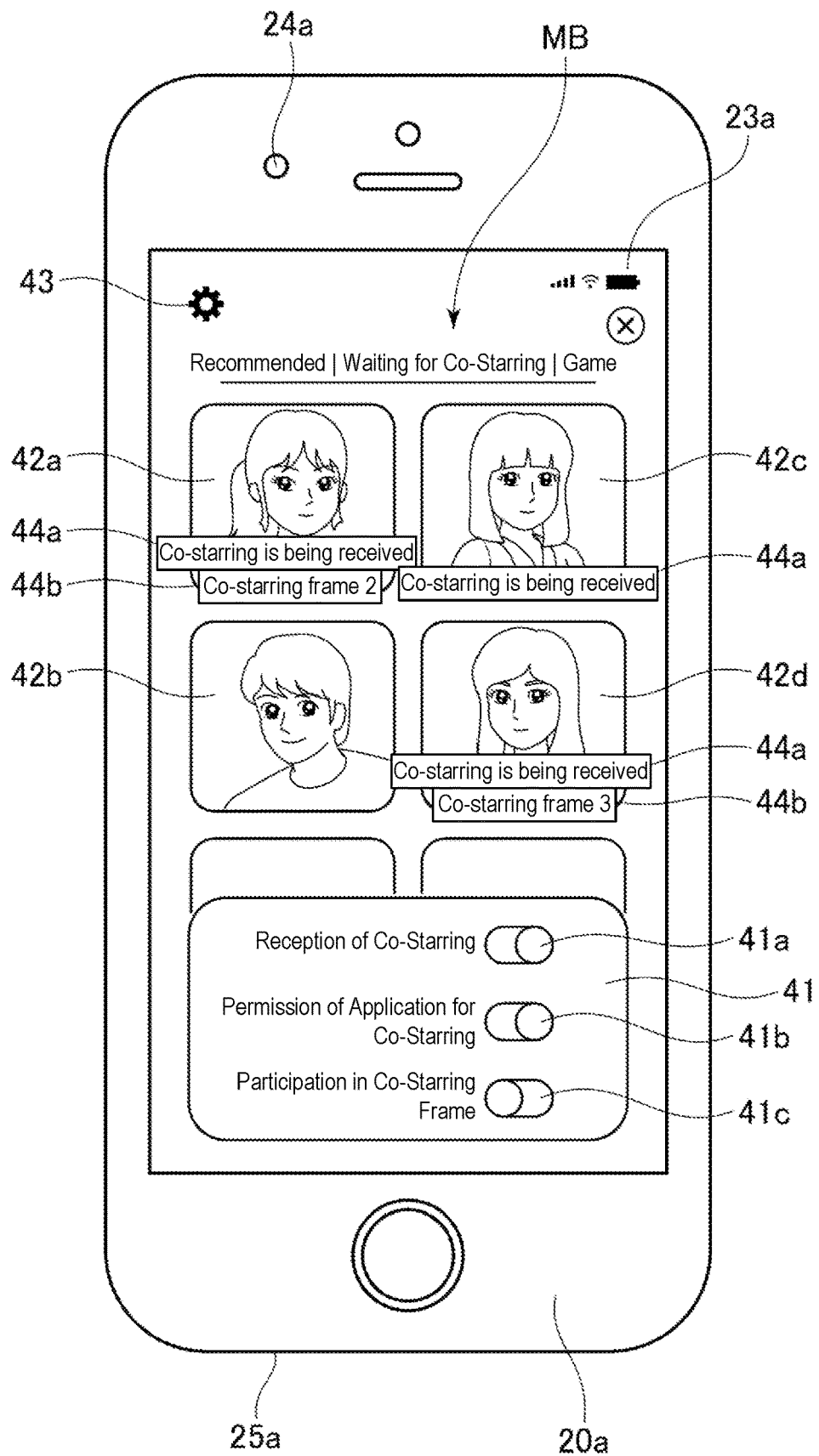
FIG. 5 is a diagram illustrating an example of a setting screen displayed on a distribution user device 20a in one embodiment.

FIG. 5 illustrates an example of a screen displayed on the distribution user device. FIG. 5 illustrates an example of the screen displayed on the distribution user device 20a. A screen that is the same as or similar to the screen illustrated in FIG. 5 may be displayed on the distribution user devices other than the distribution user device 20a included in the moving image distribution system 1. As illustrated in FIG. 5, a menu bar MB is disposed in an upper portion of the screen displayed on the distribution user device 20a. The menu bar MB includes items of "Recommended", "Waiting for co-starring" and "Game". The menu bar MB may include items other than those.

In the example illustrated in FIG. 5, it is assumed that "Recommended" is selected in the menu bar MB. The distribution user Ua can flick the display 23a of the distribution user device 20a in the left-right direction to switch the screen to any of the items included in the menu bar MB. For example, when a screen corresponding to "Recommended" is displayed, the distribution user Ua can flick the display 23a to the left to perform switching to the screen corresponding to the item of "Game" or "Waiting for co-starring".

The screen illustrated in FIG. 5 is displayed, for example, after the moving image application program is started in the distribution user device 20a. When the moving image application program is started in the distribution user device 20a, a list of the moving images that are being distributed or the distribution users that are distributing the moving images is acquired from the server 60. After the moving image application program is started, the screen corresponding to "Recommended" in the menu bar MB is displayed. As illustrated in FIG. 5, the screen corresponding to the "Recommended" includes an icon indicating the moving image that is being distributed (or an icon indicating the character object of the distribution user that is distributing the imaging image). For example, an icon indicating a popular moving image, an icon indicating a moving image that attracts attention, or an icon indicating a moving image recommended for viewing for other reasons is displayed on the screen corresponding to "Recommended". In the example illustrated in FIG. 5, icons 42a to 42d corresponding to the moving images that are being distributed are displayed. In addition, two icons are hidden behind a setting window 41.

A message 44a indicating that the distribution user that distributes the moving image receives the second co-starring application from other users (that is, the distribution user is the second co-starrable user) may be displayed in association with the icon indicating the moving image that is being distributed. The message 44a includes a text "Co-starring is being received". In the example illustrated in FIG. 5, since the distribution users of the moving images corresponding to the icons 42a, 42c, and 42d receive the second co-starring application from other users, the message 44a is displayed so as to be associated with each of the icons 42a, 42c, and 42d (for example, so as to overlap each icon). Since the distribution user of the moving image corresponding to the icon 42b does not receive the second co-starring application from other users, the message 44a is not displayed in association with the icon 42b. In addition, in a case in which the distribution user is the first co-starrable user, co-starring frame information 44b indicating a co-starring frame represented by a difference between the upper limit on the number of co-stars and the number of users that are co-starring with the distribution user may be displayed in association with the icon of the distribution user. In the example illustrated in FIG. 5, it is assumed that the distribution users corresponding to the icons 42a and 42d are the first co-starrable users. The co-starring frame information 44b indicating that the co-starring frames are "2" for the distribution user corresponding to the icon 42a is displayed in association with the icon 42a. In addition, the co-starring frame information 44b indicating that the co-starring frames are "3" for the distribution user corresponding to the icon 42d is displayed in association with the icon 42d. In the list of the moving images being distributed which is displayed on the distribution user device in this way, whether each of the distribution users of the moving images included in the list is the first co-starrable user or the second co-starrable user is distinctively displayed.

The screen displayed on the distribution user device 20a includes a setting button 43. When this setting button 43 is selected, the setting window 41 is displayed as illustrated in FIG. 5. In some embodiments, settings may be adjusted not only before distribution, but may also be adjusted during distribution by means of setting button 43. The setting window 41 includes switches 41a, 41b, and 41c. Each of the switches 41a, 41b, and 41c is turned on or off by the operation of the user (for example, a slide operation in the left-right direction). The switch 41a is a switch for turning on and off the registration flag. For example, in a case in which the switch 41a is turned on, when the switch 41a is turned on in the distribution user device 20a, a request (hereinafter, referred to as a "registration request") to switch the registration flag such that the distribution user Ua is the first co-starrable user is transmitted from the distribution user device 20a to the server 60. Then, in the server 60, the registration flag associated with the user ID of the distribution user Ua in the user information 63b is switched from "0" to "1". On the contrary, when the switch 41a is turned off, the registration flag in the user information 63b on the distribution user Ua is switched from "1" to "0".

Further, in a case in which the switch 41b is turned on, a request to switch the co-starring reception flag such that the distribution user Ua is the second co-starrable user is transmitted from the distribution user device 20a to the server 60. Then, in the server 60, the co-starring reception flag associated with the user ID of the distribution user Ua in the user information 63b is switched from "0" to "1". On the contrary, when the switch 41b is turned off, the co-starring reception flag in the user information 63b is switched from "1" to "0".

The switch 41c is a switch for transmitting the first co-starring application. The switch 41c is turned on to transmit the first co-starring application from the distribution user device 20a to the server 60.

Only the icon of the moving image, in which the distribution user is registered as the first co-starrable user, among all of the moving images that are being distributed in the list acquired from the server 60 may be displayed on the screen corresponding to "Waiting for co-starring" in the menu bar MB. In addition, only the icon of the moving image, in which the distribution user is registered as the second co-starrable user, among all of the moving images that are being distributed in the list acquired from the server 60 may be displayed on the screen corresponding to "Waiting for co-starring". Only the icon of the moving image, in which the distribution user is registered as either the first co-starrable user or the second co-starrable user, among all of the moving images that are being distributed in the list acquired from the server 60 may be displayed on the screen corresponding to "Waiting for co-starring". Therefore, the distribution user Ua operates the screen to display the screen corresponding to the item of "Waiting for co-starring", which makes it possible to efficiently search for the distribution user that is the co-starring partner.

On the screen corresponding to "Game" in the menu bar MB, a list of games (not illustrated) provided by the moving image distribution system 1 in which the character object of the distribution user Ua can participate is displayed. The games provided by the moving image distribution system 1 include a party game in which a plurality of persons participate, such as a so-called "werewolf game". The moving image distribution system 1 can provide a virtual party game in which each distribution user participates using the character object. In a real-world party game, a real person participates as a player. However, in the virtual party game provided by the moving image distribution system 1, the users of the moving image distribution system 1 participate using the character objects. The rules of the virtual party game may be the same as the rules of the real-world party game. The distribution user Ua can select a desired party game from the screen corresponding to "Game" and play the selected party game as a game master. When starting the party game, the distribution user Ua can invite other participants to the game. In a case in which the distribution user Ua starts the party game in which his or her character object participates from the screen corresponding to "Game", a registration request to set the distribution user Ua as the first co-starrable user may be transmitted from the distribution user device 20a to the server 60. In this case, the distribution user that has started the party game is registered as the first co-starrable user. Games other than the party game may be provided on the screen corresponding to "Game".

The moving image distribution system 1 may has a function of distributing the play moving image of the game played by the user when the user plays the game. The distributed game is, for example, a web game. A list of the play moving images distributed by the distribution user Ua may be displayed on the screen corresponding to "Game" in the menu bar MB. A character object 31 of the distribution user Ub or the icon of the distribution user Ub may be displayed on the play moving image of the game distributed by the distribution user Ub in the moving image distribution system 1.

Next, the functions implemented by the computer processors 21a and 21b will be described in detail. The computer processor 21a executes computer-readable commands included in the moving image application program to function as a motion data management unit 21a1, a display control unit 21a2, and a co-starring application unit 21a3. Similarly, the computer processor 21b executes computer-readable commands included in the distribution program to function as a motion data management unit 21b1, a display control unit 21b2, and a co-starring application unit 21b3. At least some of the functions implemented by the computer processors 21a and 21b may be implemented by computer processors other than the computer processors 21a and 21b of the moving image distribution system 1. At least some of the functions implemented by the computer processors 21a and 21b may be implemented by, for example, the computer processor 61 provided in the server 60.

The motion data management unit 21a1 generates face motion data which is the digital representation of the movement of the face of the distribution user Ua based on the image data of the camera 24a. Similarly, the motion data management unit 21b1 generates face motion data which is the digital representation of the movement of the face of the distribution user Ub based on the image data of the camera 24b. The face motion data is generated at any time with the passage of time. The face motion data may be generated at predetermined sampling time intervals. As described above, the face motion data generated by the motion data management unit 21a1 can digitally represent the movement of the face (a change in facial expressions) of the distribution user Ua in time series, and the face motion data generated by the motion data management unit 21b1 can digitally represent the movement of the face (a change in facial expressions) of the distribution user Ub in time series.

The distribution user device 20 may generate body motion data which is the digital representation of the position and direction of each part other than the face in the bodies of the distribution users Ua and Ub, in addition to the face motion data generated by the motion data management unit 21a1. The distribution user device 20 may transmit the body motion data to the server 60 in addition to the face motion data. The distribution users Ua and Ub may be equipped with motion sensors in order to generate the body motion data. The distribution user device 20 may be configured to generate the body motion data based on detection information from the motion sensors attached to the distribution user Ua or Ub. The body motion data may be generated at predetermined sampling time intervals. As described above, the body motion data represents the movement of the body of the distribution user Ua or Ub as digital data in time series. The generation of the body motion data based on the detection information from the motion sensors attached to the distribution user Ua or Ub may be performed in, for example, a photographing studio. The imaging studio may be provided with a base station, a tracking sensor, and a display. The base station may be a multi-axis laser emitter. The motion sensor attached to the distribution user Ua or Ub may be, for example, Vive Tracker provided by HTC CORPORATION. The base station provided in the imaging studio may be, for example, a base station provided by HTC CORPORATION. In addition, a supporter computer may be installed in a room separate from the imaging studio. The display in the imaging studio may be configured to display information received from the supporter computer. The server 60 may be installed in the same room as the supporter computer. The room in which the supporter computer is installed and the imaging studio may be separated by a glass window. In this case, an operator of the supporter computer (in some cases, referred to as a "supporter" in the specification) can visually recognize the distribution users Ua and Ub. The supporter computer may be configured such that it is operated by the supporter to change the settings of various devices provided in the imaging studio. For example, the supporter computer can change the setting of a scanning interval by the base station, the setting of a tracking sensor, and various settings of various other devices.

The face motion data and the body motion data generated by the motion data management units 21a1 and 21b1 are collectively referred to as "motion data". The motion data management unit 21a1 outputs the generated motion data to the display control unit 21a2. In a viewing mode, the display control unit 21a2 performs rendering based on the motion data generated by the motion data management unit 21a1, voice data related to the voice acquired from the microphone 25a, the model data 26a1, the object data 26a2, and other data if necessary and generates moving image data including the animation of the character object of the distribution user Ua. The data used to generate the moving image data including the animation of the character object of the distribution user Ua is referred to as "animation configuration data" and is referred to as "animation configuration data of the distribution user Ua" in a case in which it is necessary to distinguish which distribution user's character object is included. The animation configuration data of the distribution user Ua can include, for example, the motion data of the distribution user Ua and the model data 26a1 and the object data 26a2 of the distribution user Ua. The display control unit 21b2 performs rendering in the same manner as the display control unit 21a2 based on the animation configuration data of the distribution user Ub. The description of the display control unit 21a2 is also applied to the display control unit 21b2 as long as there is no contradiction.

The rendering means a drawing process including perspective projection, hidden surface removal (rasterization), shading, texture mapping, and other known processes. The display control unit 21a2 outputs the generated moving image data to the display 23a and a speaker (not illustrated). The animation of the character object of the distribution user Ua is generated by applying the motion data to the model data 26a1. The display control unit 21a2 combines or superimposes the character object of the distribution user Ua with or on other information to generate moving image data and outputs the generated moving image data to the display 23a. The information combined with or superimposed on the animation may include a message posted by the viewing user, a notification transmitted from the server 60, a graphical user interface (GUI) part such as an operation button, and other information.

In a case in which the distribution user Ua co-stars with another user, the display control unit 21a2 acquires the animation configuration data, which is necessary to generate the character object of the co-starring partner, from the distribution user device of the distribution user that is the co-starring partner through the server 60 and performs rendering based on the acquired animation configuration data of the co-starring partner and the animation configuration data of the distribution user Ua to generate co-starring moving image data including the character object of the distribution user Ua and the character object of the co-starring partner. The generated co-starring moving image data is output to the display 23a.

The display control unit 21a2 can transmit a portion or all of the animation configuration data of the distribution user Ua to the server 60 in order to distribute the moving image of the distribution user Ua.

The co-starring application unit 21a3 transmits a co-starring application for co-starring with another distribution user to the server 60 based on the operation of the distribution user Ua on the distribution user device 20a. Similarly, the co-starring application unit 21b3 transmits a co-starring application for co-starring with another distribution user to the server 60 based on the operation of the distribution user Ub on the distribution user device 20b. The description of the co-starring application unit 21a3 is also applied to the co-starring application unit 21b3 as long as there is no contradiction. The co-starring application transmitted from the distribution user device 20a or 20b may be the first co-starring application that does not designate the co-starring partner or may be the second co-starring application that designates the co-starring partner.

The first co-starring application is a request for co-starring with any of the first co-starrable users, for which the registration flag has been set to "on", among the distribution users that are distributing the moving images in the moving image distribution system 1, without designating the co-starring partner. The first co-starring application may include the user ID of the user that transmits the first co-starring application. The first co-starring application may not include information for designating, identifying, or specifying the co-starring partner. For example, in a case in which the distribution user Ua transmits the first co-starring application from the distribution user device 20a, the first co-starring application includes the user ID for identifying the distribution user Ua, but does not include information for designating the co-starring partner.

For example, the first co-starring application may be transmitted from the distribution user device 20a to the server 60 by the operation of the user on the switch 41c (for example, a slide operation to the right) in the setting window 41 illustrated in FIG. 5. The first co-starring application may be transmitted to the server 60 by methods other than the method of operating the switch 41c. For example, the first co-starring application may be transmitted from the distribution user device 20a to the server 60 by the operation of an operation button that is displayed on the home screen, an operation button that is displayed so as to be superimposed on the moving image being distributed, or an operation button other than these operation buttons. As described above, the first co-starring application can be transmitted from the distribution user device to the server 60 while the distribution user is viewing the moving image being distributed or while the distribution user does not view the moving image. The first co-starring application may be transmitted to the server 60 not only from the distribution user device 20a but also from the distribution user device 20b and other distribution user devices.

The second co-starring application is a request to apply for co-starring with a specific co-starring partner. Therefore, the second co-starring application includes a user ID for identifying the co-starring partner. The second co-starring application differs from the first co-starring application which does not include the identification information for identifying the co-star partner in that it includes the identification information for identifying the co-starring partner. The second co-starring application may be transmitted from the distribution user device 20a to the server 60 in response to the selection of a co-starring application button 36 displayed while the distribution user is viewing the moving image being distributed, which will be described below.

Next, the functions implemented by the computer processor 61 will be described in more detail. Similarly, the computer processor 61 executes the computer-readable commands included in the distribution program to function as a distribution management unit 61a, a user registration unit 61b, a first co-starring application processing unit 61c, and a second co-starring application processing unit 61d.

The distribution management unit 61a stores various kinds of data received from the viewing user device 10 or the distribution user device 20 in the storage 63 or other storages. The distribution management unit 61a acquires the data requested from the viewing user device 10 or the distribution user device 20 from the storage 63 or other storages and transmits the acquired data to the viewing user device 10 or the distribution user device 20 which is a request source. For example, the distribution management unit 61a transmits a list of the moving images, which are being distributed, to the viewing user device 10 or the distribution user device 20 which is the request source in response to the request from the viewing user device 10 or the distribution user device 20. When receiving a request to view the moving image selected from the list, which includes the identification information on the moving image, from the viewing user device 10 or the distribution user device 20, the distribution management unit 61a transmits the animation configuration data related to the moving image specified by the identification information to the viewing user device 10 or the distribution user device 20 which is the request source. The viewing user device 10 or the distribution user device 20 that has received the animation configuration data can perform rendering based on the received animation configuration data to generate the moving image data of the moving image corresponding to the viewing request and can output the moving image data to the display or the speaker. As described above, the distribution management unit 61a transmits the animation configuration data of the moving image corresponding to the viewing request to the viewing user device 10 or the distribution user device 20 to distribute the moving image.

In a case in which the distribution management unit 61a receives a posted message from the viewing user device 10 or the distribution user device 20 for the moving image being distributed, it transmits the received posted message to the distribution user device of the distribution user that is distributing the moving image, and the viewing user device 10 and the distribution user device 20 through which the moving image is being viewed. The posted message may include text data indicating the content of the message, the user ID of the user that posts the message, the posting date and time, and information other than those. The viewing user device 10 or the distribution user device 20 that has received the posted message can display the received posted message or the poster that has posted the message.

The distribution management unit 61a can transmit a system notification related to the distribution or viewing of the moving image to the viewing user device 10 or the distribution user device 20. For example, when the user A starts to view the moving image, the distribution management unit 61a transmits a notification message "The user A has entered the room" to the distribution user device of the distribution user that is distributing the moving image, and the viewing user device 10 and the distribution user device 20 through which the moving image is being viewed. The viewing user device 10 or the distribution user device 20 that has received the notification message can display the received notification message.

In a case in which the host user and the guest user co-star, the distribution management unit 61a transmits the animation configuration data of the host user to the distribution user device 20 of the guest user and transmits the animation configuration data of the guest user to the distribution user device 20 of the host user. Each of the distribution user devices 20 of the guest user and the host user performs rendering based on the animation configuration data of the co-starring partner received from the distribution management unit 61a to generate moving image data including the animation of the character object of the co-starring partner. Therefore, the distribution user device 20 of each of the host user and the guest user that are co-starring can generate moving image data including the animation of the character object of the distribution user and the animation of the character object of the co-starring partner. Further, when the server 60 receives a viewing request to view a co-starring moving image, in which the host user and the guest user co-star, from the viewing user device 10 or the distribution user device, the distribution management unit 61a transmits the animation configuration data of the host user and the animation configuration data of the guest user to the viewing user device 10 or the distribution user device which is a transmission source of the viewing request. The viewing user device 10 or the distribution user device that has received the animation configuration data of the host user and the animation configuration data of the guest user can perform rendering based on the animation configuration data of the host user and the animation configuration data of the guest user to generate moving image data including the character object of the host user and the character object of the guest user. Therefore, the user that has requested the viewing of the co-starring moving image can view the co-starring moving image through the viewing user device 10 or the distribution user device.

In one or more embodiments of the invention, when receiving a registration request for registration as the first co-starrable user from the distribution user device of any user, the user registration unit 61b registers the user as the first co-starrable user. As described above, the registration request may be transmitted to the server 60 by operating the switch 41a in the distribution user device. The registration request transmitted from the distribution user device may include a user ID for identifying the distribution user. When receiving the registration request from the distribution user device of a certain user, the user registration unit 61b can set the registration flag, which is associated with the user ID included in the registration request in the user information 63b, to "1". When the registration flag corresponding to the user ID is set to "1", the user identified by the user ID becomes the first co-starrable user.

In one or more embodiments of the invention, in a case in which the first co-starring application processing unit 61c receives the first co-starring application from the distribution user device of any user (co-starring application user) in the moving image distribution system 1, it selects the first co-starring user among the first co-starrable users. In response to the selection of the first co-starring user based on the first co-starring application from the co-starring application user, the distribution of the co-starring moving image in which the co-starring application user and the first co-starring user co-star is started. Specifically, the user ID of the co-starring application user is stored in the co-starring management information 63c in association with the moving image ID of the moving image distributed by the first co-starring user. Therefore, it is possible to determine that the co-starring application user and the first co-starring user are co-starring with reference to the co-starring management information 63c. When the server 60 receives a viewing request including the moving image ID of the co-starring moving image in which the co-starring application user and the first co-starring user co-star, the distribution management unit 61a acquires the user ID of the host user and the user ID of the guest user associated with the moving image ID included in the viewing request, acquires the animation configuration data of each of the host user and the guest user that are co-starring based on the user IDs, and transmits the acquired animation configuration data of the host user and the acquired animation configuration data of the guest user to the viewing user device 10 or the distribution user device that is a transmission source of the viewing request. This configuration enables the distribution management unit 61a to distribute the co-starring moving image to the viewing user device 10 or the distribution user device.

In a case in which the first co-starring application processing unit 61c receives the first co-starring application, for example, the first co-starring application processing unit 61c can specify the user, for which the registration flag is set to "1", as the first co-starrable user based on the user information 63b and select the first co-starring user, that is the co-starring partner of the co-starring application user that has transmitted the first co-starring application, from the specified first co-starrable users. The first co-starring application processing unit 61c can select the first co-starring user from the first co-starrable users according to various algorithms. In one embodiment, the first co-starring application processing unit 61c can randomly select one first co-starring user from the first co-starrable users. In another embodiment, the first co-starring application processing unit 61c specifies the number of co-stars in the moving image distributed by each of the first co-starrable users with reference to the co-starring management information 63c and selects the first co-starring user based on the specified number of co-stars. For example, the first co-starring application processing unit 61c may select, as the first co-starring user, a user that is co-starring with the smallest number of users among the first co-starrable users. In a case in which there are a plurality of first co-starrable users that have the smallest number of co-stars (for example, first co-starrable users that are not co-starring with anyone and the number of co-stars is set to "0"), the first co-starring application processing unit 61c may randomly select the first co-starring user from the plurality of first co-starrable users that have the smallest number of co-stars. In a case in which the user ID of the first co-starrable user is not recorded as the distribution user identification information in the co-starring management information 63c, the first co-starring user does not distribute the moving image. Therefore, in the selection of the first co-starring user, the number of co-stars in the first co-starrable users can be set to "0".

In one embodiment of the invention, the first co-starring application processing unit 61c can select the first co-starring user based on the co-starring frame which is the difference between the upper limit on the number of co-stars for each of the first co-starrable users and the number of co-stars that are actually co-starring. For example, in a case in which the upper limit on the number of co-stars for a certain first co-starrable user is "5" and the number of users that are co-staring is "1" (that is, in a case where co-starring with only one user), co-starring frames of the first co-starrable users are "4". In one embodiment of the invention, the difference between the upper limit on the number of co-stars for each of the first co-starrable users and the number of co-stars that are actually co-starring may be calculated as the co-starring frame, and a user having the largest number of co-starring frames among the first co-starrable users may be selected as the first co-starring user. As described above, among the first co-starrable users, a user that co-stars with the smallest number of users or a user having the largest number of co-starring frames is selected as the first co-starring user, which makes it easy to select, as the first co-starring user, a user that relatively inactively co-stars with other users among the first co-starrable users.

In another embodiment of the invention, the user having the smallest number of co-starring frames among the first co-starrable users (however, the co-starring frame is not "0") may be selected as the first co-starring user. In this case, since a user that has already co-starred with another user is easily selected as the first co-starring user, it is possible to make the co-starring application user co-star with the distribution user that has already actively co-starred with another distribution user.

In one embodiment of the invention, the first co-starring application processing unit 61$c$ selects the first co-starring user from the first co-starrable users based on the user attribute information about each of the co-starring application user and the first co-starrable users. As described above, the user information 63$b$ may include user attribute information indicating various attributes of each user. For example, the first co-starring application processing unit 61$c$ may specify the user attribute information about the co-starring application user based on the user ID of the co-starring application user included in the first co-starring application, calculate a score indicating the degree of matching between the user attribute information about the co-starring application user and the user attribute information about each of the first co-starrable users based on a predetermined algorithm, and select a user having the highest score among the first co-starrable users as the first co-starring user. When the score indicating the degree of matching is calculated, individual attribute data (for example, a place of residence, age, sex, and a hobby) included in the user attribute information may be weighted. In this case, for example, among the first co-starrable users, a user whose place of residence is close to that of the co-starring application user, a user in an age group that overlaps with the age group of the co-starring application user, or a user that has the same hobby as the co-starring application user is easily selected as the first co-starring user. This configuration makes it possible to select, as the first co-starring user, a user having a high degree of matching of the attribute data included in the user attribute information from among the first co-starrable users. Therefore, even when a co-starring moving image is generated based on the first co-starring application that does not specify the co-starring partner, it is easy to find a common topic between the users that co-star. As a result, it is possible to promote communication in the co-starring moving image which is started based on the first co-starring application.

In one embodiment of the invention, in a case in which the second co-starring application processing unit 61$d$ receives the second co-starring application from the co-starring application user, it determines whether or not to permit the second co-starring application of the co-starring application user. As described above, the second co-starring application may be transmitted to the server 60 by selecting the co-starring application button 36 while the distributed moving image is being viewed, and the server 60 may receive the transmitted second co-starring application. For example, when the second co-starring application for co-starring with the distribution user Ub is received from the distribution user Ua, the second co-starring application processing unit 61$d$ determines whether or not the distribution user Ua and the distribution user Ub can co-star. For example, the second co-starring application processing unit 61$d$ may transmit a message inquiring whether or not to permit the co-starring application from the distribution user Ua to the distribution user device 20$b$ of the distribution user Ub and determine whether or not to co-starring is possible according to a response from the distribution user device 20$b$.

Figure 6:
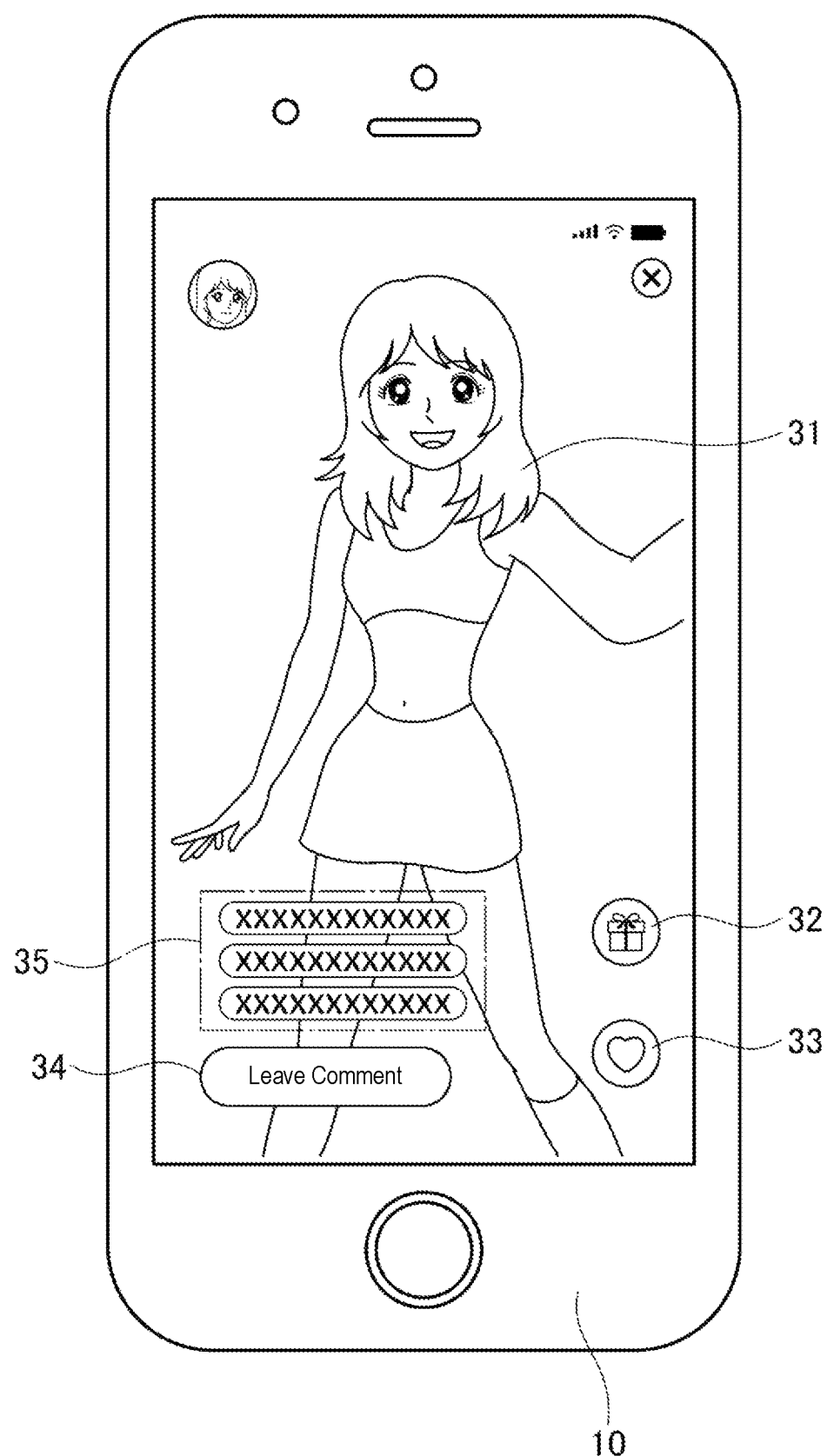
FIG. 6 is a diagram illustrating an example of a setting screen displayed on a viewing user device 10 in one embodiment.
Figure 7:
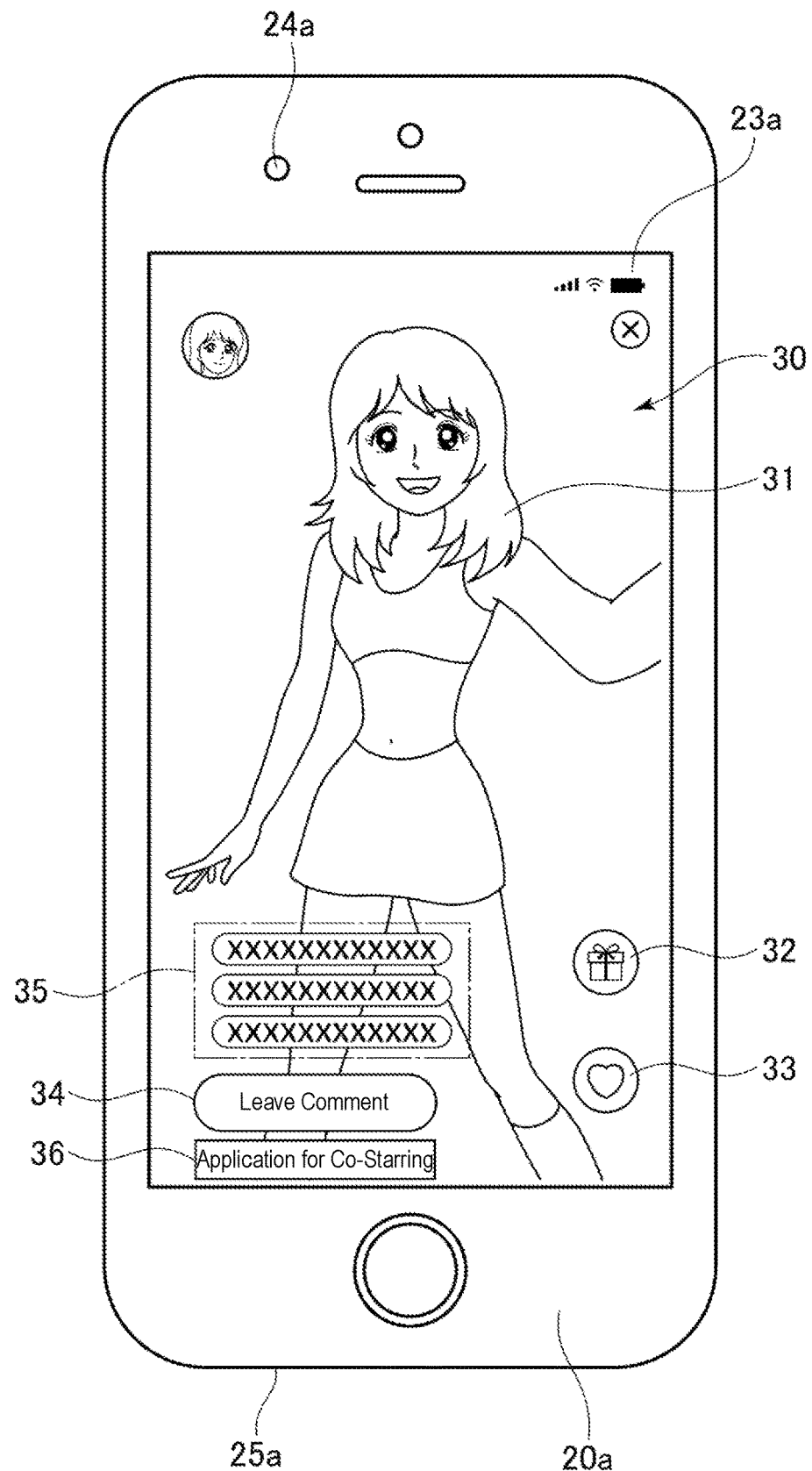
FIG. 7 is a diagram illustrating an example of a moving image displayed on the distribution user device 20a in one embodiment.
Figure 8:
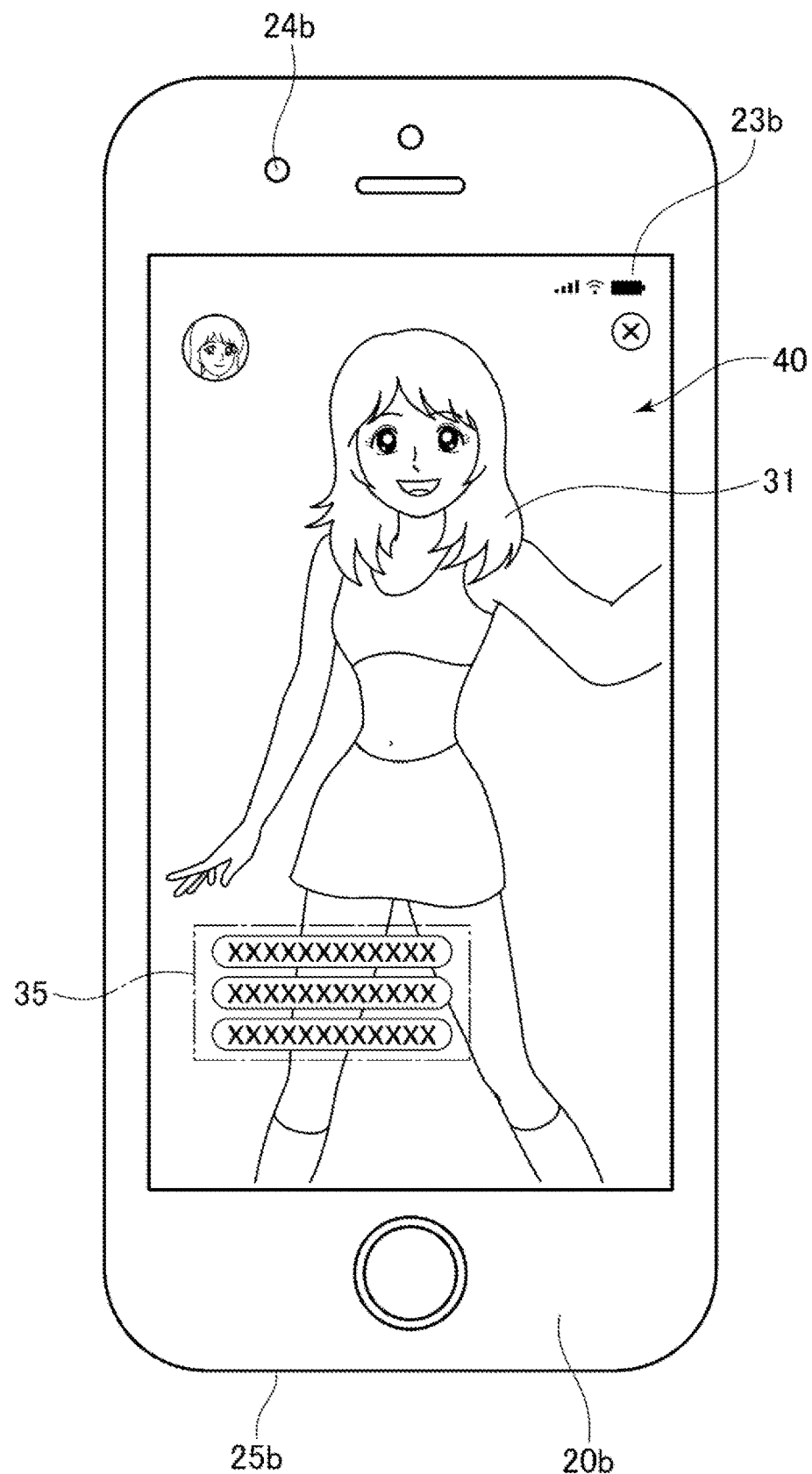
FIG. 8 is a diagram illustrating an example of a moving image displayed on a distribution user device 20b in one embodiment.

Next, the display of an image corresponding to the moving image distributed in the moving image distribution system 1 will be described with reference to FIGS. 6 to 8. In FIGS. 6 to 8, it is assumed that the viewing user of the viewing user device 10 and the distribution user Ua of the distribution user device 20$a$ select the viewing of the moving image being distributed by the distribution user Ub from the moving image list being distributed and transmit a request to view the moving image to the server 60, the server 60 transmits the animation configuration data of the distribution user Ub to the viewing user device 10 and the distribution user device 20$a$ in response to the viewing request, and the viewing user device 10 and the distribution user device 20$a$ perform rendering based on the animation configuration data of the distribution user Ub received from the server 60. The animation configuration data of the distribution user Ub may include motion data generated by the motion data management unit 21$b$1 and voice data generated based on the voice detected by the microphone 25$b$ in the distribution user device 20$b$ of the distribution user Ub. In addition, it is assumed that the distribution user device 20$b$ performs rendering based on the animation configuration data of the distribution user Ub acquired from the server 60 or the animation configuration data generated by the device. FIG. 6 illustrates an example of a moving image displayed on the viewing user device 10, FIG. 7 illustrates an example of a moving image displayed on the distribution user device 20$a$, and FIG. 8 illustrates an example of a moving image displayed on the distribution user device 20$b$.

As illustrated in FIG. 6, the image corresponding to the moving image data generated by performing rendering based on the animation configuration data of the distribution user Ub received from the server 60 is displayed on the display of the viewing user device 10. The image displayed on the viewing user device 10 includes the character object 31 of the distribution user Ub generated by the rendering, a gift button 32, an evaluation button 33, a comment button 34, and a comment display region 35.

As illustrated in FIG. 7, an image 30 corresponding to the moving image data generated by performing rendering based on the animation configuration data of the distribution user Ub received from the server 60 is displayed on the display 23$a$ of the distribution user device 20$a$. The image 30 includes the character object 31 of the distribution user Ub, the gift button 32, the evaluation button 33, the comment button 34, and the comment display region 35, similarly to the moving image displayed on the viewing user device 10. In addition to this, the image 30 includes a co-starring application button 36 for applying for co-starring with the distribution user Ub in the moving image distributed by the distribution user Ub. When the co-starring application button 36 is operated, the second co-starring application is transmitted to the server 60. For example, the distribution user device 20$a$ can execute application software including the moving image application program to display the distributed image 30. In one embodiment of the invention, the co-starring application button 36 for transmitting the second co-starring application for co-starring with the distribution user Ub may be displayed on the distribution user device only in a case in which the moving image of the distribution user Ub is being viewed. In one embodiment of the invention, the co-starring application button 36 may be displayed on the image 30 in the distribution user device 20a only in a case in which the distribution user Ub is registered as the second co-starrable user and may not be displayed on the distribution user device 20a in a case in which the distribution user Ub is not registered as the second co-starrable user.

As illustrated in FIG. 6, the moving image displayed on the viewing user device 10 does not include the co-starring application button 36. For example, in a case in which application software including the distribution program is not downloaded or installed in the viewing user device 10 or in a case in which the application software including the distribution program is not started in the viewing user device 10, the co-starring application button 36 is not displayed on the viewing user device 10. In a case in which the application software including the moving image application program is downloaded or installed in the viewing user device 10 or in a case in which the application software including the moving image application program is started in the viewing user device 10, the co-starring application button 36 may be displayed on the viewing user device 10.

Since the character object 31 is generated by applying the motion data of the distribution user Ub to the model data 63a, the facial expression or movement of the character object 31 changes in synchronization with the facial expression or movement of the distribution user Ub.

The gift button 32 is displayed on the image 30 so as to be selectable by operating the viewing user device 10. For example, the gift button 32 can be selected by a tapping operation on a region in which the gift button 32 is displayed in the touch panel of the viewing user device 10. In one embodiment, when the gift button 32 is selected, a window for selecting a gift to be given to the distribution user (here, the distribution user Ub) that is distributing the moving image being viewed is displayed on the image 30. The viewing user can purchase a gift to be given from the gifts displayed in the window. In another embodiment, a window including a list of purchased gifts is displayed on the image 30 in response to the selection of the gift button 32. In this case, the viewing user can select a gift to be given from the gifts displayed in the window. When the gift button 32 is selected on the viewing user device 10, gifting information may be transmitted to the server 60. The gifting information may include gift identification information (gift ID) for identifying the gift to be given. As described above, the viewing user that is viewing the moving image can select the gift button 32 to provide (give) a desired gift to the distribution user that is distributing the moving image.

The evaluation button 33 is displayed on the image 30 so as to be selectable by the viewing user that uses the viewing user device 10. For example, the evaluation button 33 can be selected by a tapping operation on a region in which the evaluation button 33 is displayed in the touch panel of the viewing user device 10. When the evaluation button 33 is selected by the viewing user that is viewing the moving image, evaluation information indicating that the distribution user that distributes the moving image (the distribution user Ub in the example illustrated in the drawings) has been positively evaluated or the distributed moving image has been positively evaluated may be transmitted to the server 60.

The comment button 34 is displayed on the image 30 so as to be selectable by the user. When the comment button 34 is selected by, for example, a tapping operation, a comment input window for inputting comments is displayed on the image 30. The viewing user can input comments through an input mechanism of the viewing user device 10 or the distribution user device 20a. The input comment is transmitted from the viewing user device 10 and the distribution user device 20a to the server 60. The server 60 receives comments from the viewing user device 10, the distribution user device 20a, and other user devices and displays the comments in a comment display region 35 of the moving image. Comments posted by each user are displayed, for example, in time series in the comment display region 35. The comment display region 35 occupies a portion of the image 30. There is an upper limit to the number of comments that can be displayed in the comment display region 35. In the example illustrated in FIG. 7, up to three comments can be displayed in the comment display region 35. When comments of which number is greater than the upper limit set in the comment display region 35 are posted, the comments are sequentially deleted from the comment display region 35 in chronological order of the posting time. Therefore, as the frequency of the received comments becomes higher, the display time of each comment in the comment display region 35 becomes shorter. In a case in which the comments of which number is greater than the upper limit set in the comment display region 35 are posted, the recently posted comments may be displayed in the comment display region 35, and the old posted comments that are not displayed in the comment display region 35 may be displayed in the comment display region 35 in response to the swipe of the comment display region 35.

As illustrated in FIG. 8, an image 40 corresponding to the moving image data generated by performing rendering based on the animation configuration data of the distribution user Ub is displayed on the display 23b of the distribution user device 20b. The image 40 includes the character object 31 corresponding to the distribution user Ub and the comment display region 35. The image 40 displayed on the distribution user device 20b includes the same background image, character object image, and comments as the moving image and the image 30. On the other hand, the image 40 differs from the image 30 in that it does not include the gift button 32, the evaluation button 33, the comment button 34, and the co-starring application button 36.

Figure 9:
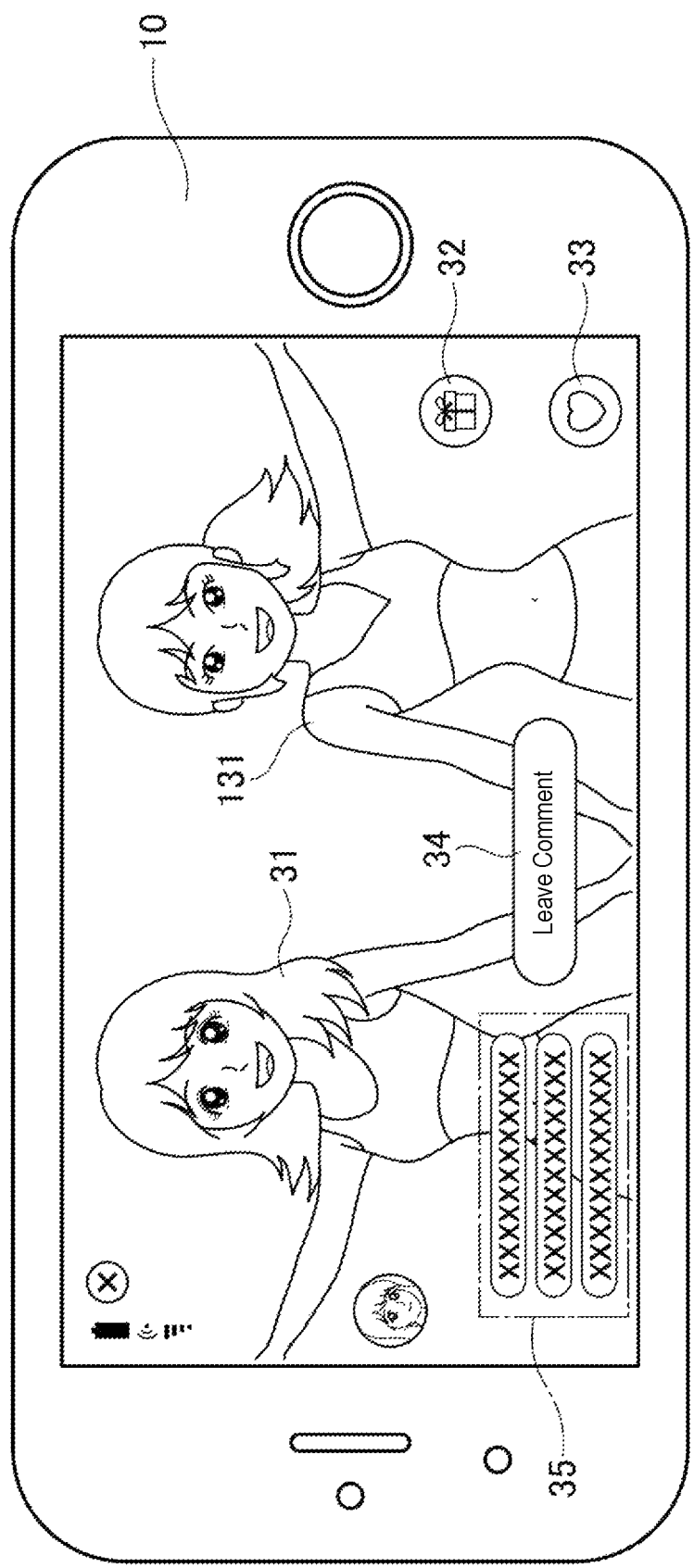
FIG. 9 is a diagram illustrating an example of a co-starring moving image displayed on the viewing user device 10 in one embodiment.
Figure 10:
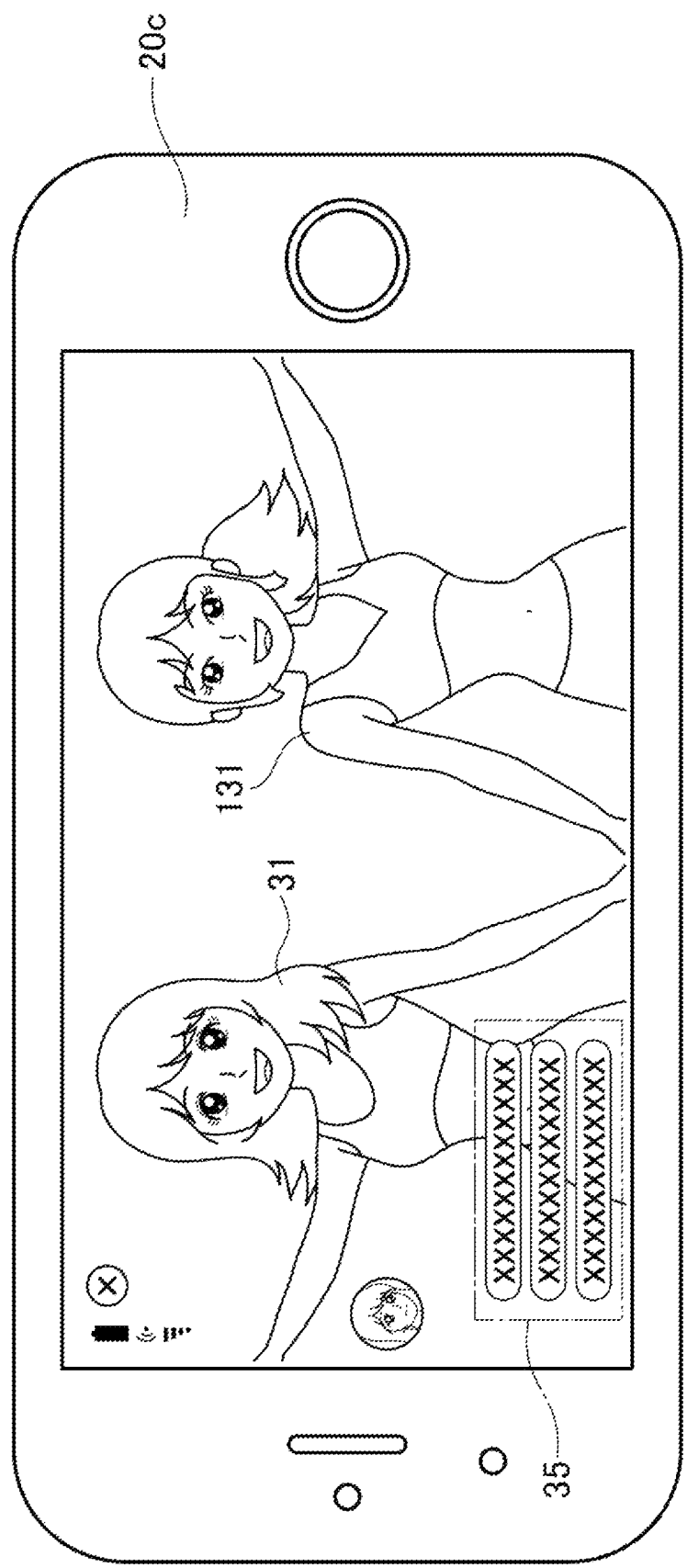
FIG. 10 is a diagram illustrating an example of a co-starring moving image displayed on a distribution user device 20c of a co-starring application user in one embodiment.
Figure 11:
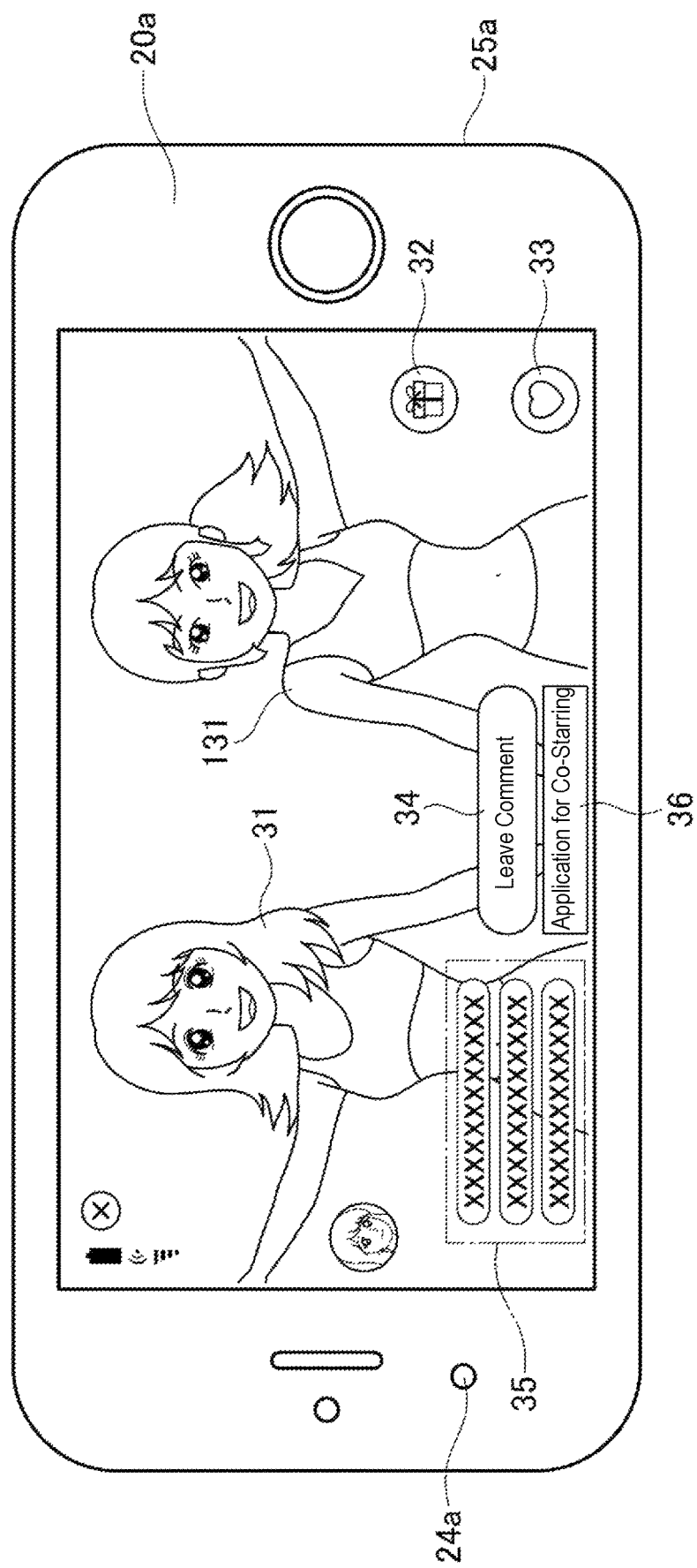
FIG. 11 is a diagram illustrating an example of a co-starring moving image displayed on the distribution user device 20a in one embodiment.
Figure 12:
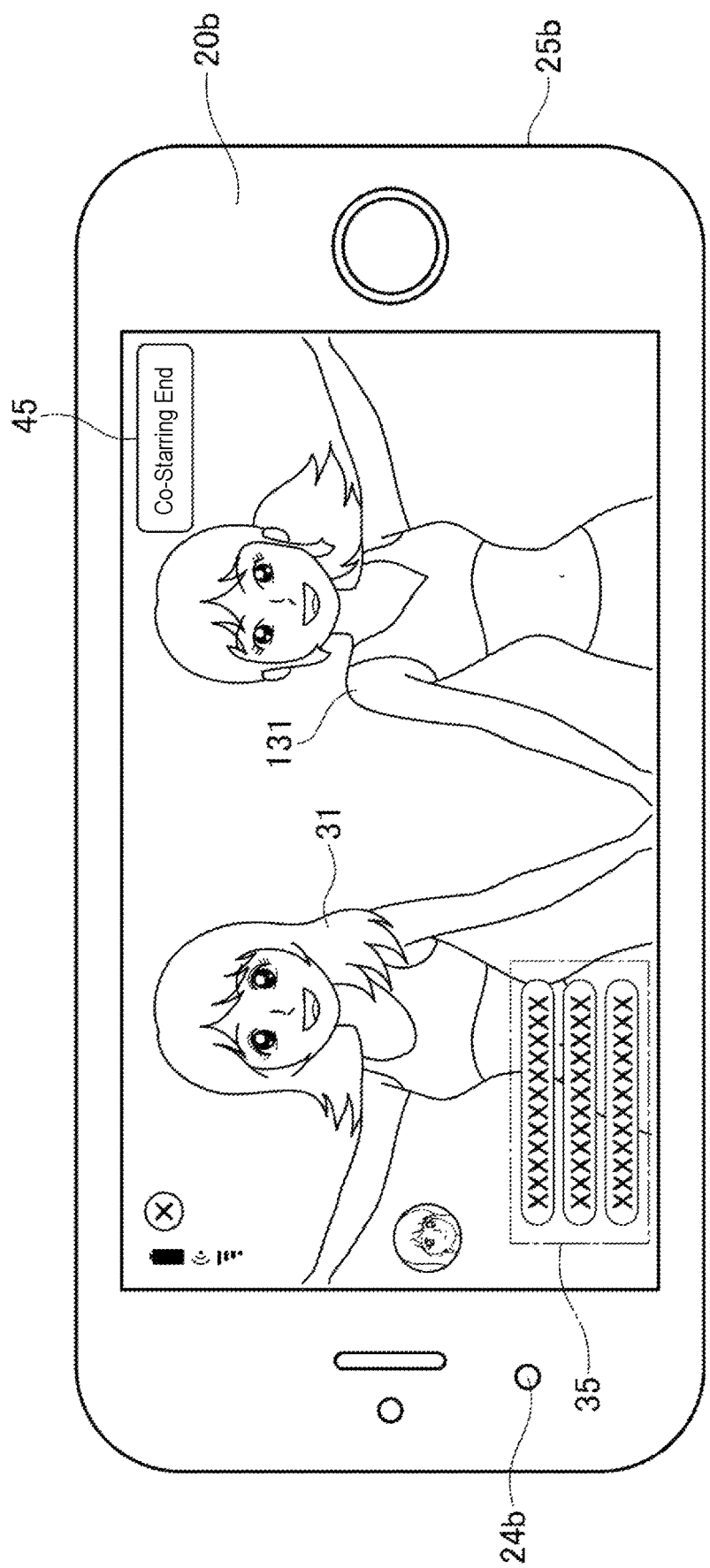
FIG. 12 is a diagram illustrating an example of a co-starring moving image displayed on the distribution user device 20b in one embodiment.

Next, the display of an image corresponding to the co-starring moving image distributed in the moving image distribution system 1 will be described with reference to FIGS. 9 to 12. FIG. 9 illustrates an example of a co-starring moving image displayed on the viewing user device 10. FIG. 10 illustrates an example of a co-starring moving image displayed on the distribution user device 20c of the distribution user Uc. FIG. 11 illustrates an example of a co-starring moving image displayed on the distribution user device 20a. FIG. 12 illustrates an example of a co-starring moving image displayed on the distribution user device 20b. In FIGS. 9 to 12, it is assumed that the distribution user Ub is selected as the first co-starring user based on the first co-starring application from the distribution user device 20c used by the distribution user Uc and a co-starring moving image including a character object 131 of the distribution user Uc and the character object 31 of the distribution user Ub is distributed. That is, in the embodiment illustrated in FIGS. 9 to 12, the distribution user Uc is the co-starring application user and the guest user. In addition, the distribution user Ub is the host user. Further, it is assumed that a viewing request for the viewing of the co-starring moving image is transmitted from the viewing user device 10 and the distribution user device 20a and the co-starring moving image is distributed to the viewing user device 10 and the distribution user device 20a.

As illustrated in FIGS. 9, 10, 11, and 12, the image corresponding to the moving image data generated by performing rendering based on the animation configuration data of the distribution user Uc and the distribution user Ub received from the server 60 is displayed on the displays of the viewing user device 10, the distribution user device 20c, the distribution user device 20a, and the distribution user device 20b. The co-starring moving image displayed on the viewing user device 10 includes the character object 131 of the distribution user Uc in addition to the character object 31 of the distribution user Ub. The character object 131 of the co-starring application user is generated based on the motion data included in the animation configuration data of the distribution user Uc. The image displayed on the viewing user device 10 includes the gift button 32, the evaluation button 33, the comment button 34, and the comment display region 35, similarly to the moving image before the start of co-starring illustrated in FIG. 6. Since the distribution user Uc has already cos-starred with the distribution user Ub, the co-starring application button 36 is not displayed on the distribution user device 20c of the distribution user Uc. The image displayed on the distribution user device 20c illustrated in FIG. 10 does not include the gift button 32, the evaluation button 33, and the comment button 34 and includes the comment display region 35, similarly to the image displayed on the distribution user device 20b illustrated in FIG. 12.

The co-starring moving image displayed on the distribution user device 20a includes the gift button 32, the evaluation button 33, the comment button 34, the comment display region 35, and the co-starring application button 36 similarly to the image before the start of co-starring illustrated in FIG. 7. The distribution user Ua can select the co-starring application button 36 even when the co-starring moving image is being played back. When the co-starring application button 36 is selected while the co-starring moving image in which the distribution user Ub is the host user is being played back, the second co-starring application for co-starring with the distribution user Ub is transmitted from the distribution user device 20a to the server 60. When the server 60 receives the second co-starring application from the distribution user device 20a, the second co-starring application processing unit 61d determines whether or not to permit the co-starring of the distribution user Ua with the distribution user Ub based on the second co-starring application. In a case in which the co-starring of the distribution user Ua with the distribution user Ub is permitted, the character object of the distribution user Ua is also displayed in the co-starring moving image in which the distribution user Uc and the distribution user Ub are co-starring. In this case, in the co-starring moving image illustrated in FIGS. 9 to 12, the character object (not illustrated) of the distribution user Ua is displayed in addition to the character object 31 of the distribution user Ub and the character object 131 of the distribution user Uc.

The co-starring moving image displayed on the distribution user device 20b includes the comment display region 35, similarly to the image before the start of co-starring illustrated in FIG. 8. Further, a co-starring end button 45 for ending the co-starring is displayed in the co-starring moving image. The co-starring end button 45 is displayed on the distribution user device 20b of the distribution user Ub that is the host user receiving the co-starring application, but is not displayed on the distribution user device 20a of the distribution user Ua that does not co-star and the distribution user device 20c of the distribution user Uc that is the guest user. When the co-starring end button 45 is selected on the distribution user device 20b of the distribution user Ub, a process for ending the co-starring of the distribution user Uc and the distribution user Ub is performed. For example, a co-starring end instruction is transmitted from the distribution user device 20b to the server 60 in response to the selection of the co-starring end button 45. When the server 60 receives the co-starring end instruction, the distribution management unit 61a ends the transmission of the animation configuration data of the distribution user Uc. Then, the character object 131 of the distribution user Uc is not displayed in the distributed moving image.

As illustrated in the drawings, the co-starring moving image is a horizontally long image. The moving image distribution system 1 distributes the co-starring moving image as a horizontally long moving image. Therefore, the distributed co-starring moving image is displayed as a horizontally long image on the viewing user device 10. In one embodiment, even when the original moving image (image) is vertically long as illustrated in FIG. 6, the co-starring moving image is converted into a horizontally long moving image and is then distributed. Since the co-starring moving image includes the character objects of two distribution users, the conversion into the horizontally long image makes it easy to display the character objects of the two users without overlapping each other. For example, in the co-starring moving image, the left half may be a region that is allocated to the character object of the original distribution user and the right half may be a region that is allocated to the character object of the co-starring application user from the viewpoint of the viewing user. The allocation of the regions to each distribution user may be arbitrarily determined such that the character objects do not overlap with each other. In the embodiment illustrated, the co-starring moving image is illustrated as the horizontally long image. However, the co-starring moving image may be a vertically long image.

Figure 13:
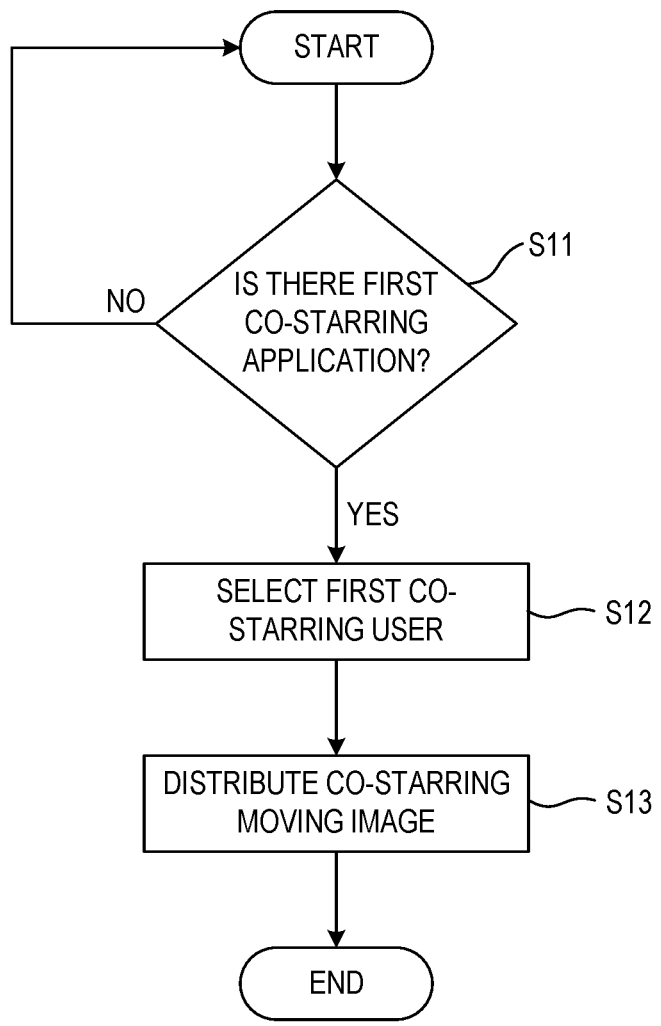
FIG. 13 is a flowchart illustrating the flow of a process of distributing the co-starring moving image based on a first co-starring application in one embodiment.

Next, a co-starring moving image distribution process in one embodiment will be described with reference to FIG. 13. FIG. 13 is a flowchart illustrating the flow of the co-starring moving image distribution process in one embodiment. In the co-starring moving image distribution process described with reference to FIG. 13, it is assumed that the distribution user Ub is selected as the first co-starring user based on the first co-starring application from the distribution user Uc.

At the start time of the co-starring moving image distribution process illustrated in FIG. 13, a large number of distribution users including the distribution user Ub are distributing the moving images including their own character objects. In Step S11, it is determined whether or not the first co-starring application has been made by any of the distribution users of the moving image distribution system 1. For example, the distribution user Uc makes the first co-starring application. In a case in which the distribution user Uc has made the first co-starring application, the process proceeds to Step S12.

In Step S12, the first co-starring user is selected from the first co-starrable users based on the first co-starring application from the distribution user Uc. In the embodiment illustrated in the drawings, the distribution user Ub is selected as the first co-starring user. Then, the co-starring of the distribution user Ub (host user) and the distribution user Uc (guest user) is started. In Step S12, the distribution user Ub is selected as the first co-starring user. For example, the first co-starring application processing unit 61*c* selects the first co-starring user.

Since the distribution user Ub is selected as the first co-starring user based on the first co-starring application from the distribution user Uc in Step S12, a co-starring moving image in which the distribution user Ub and the distribution user Uc co-star is distributed in Step S13. Specifically, in addition to the animation configuration data of the distribution user Ub, the animation configuration data of the distribution user Uc is transmitted to the viewing user device 10 and the distribution user device through which the moving image of the distribution user Ub is being viewed. The viewing user device 10 and the distribution user device that have received the animation configuration data can perform rendering based on the received animation configuration data to display a moving image including the character objects of the distribution user Ub and the distribution user Uc, for example, as illustrated in FIGS. 9 to 12.

Figure 14:
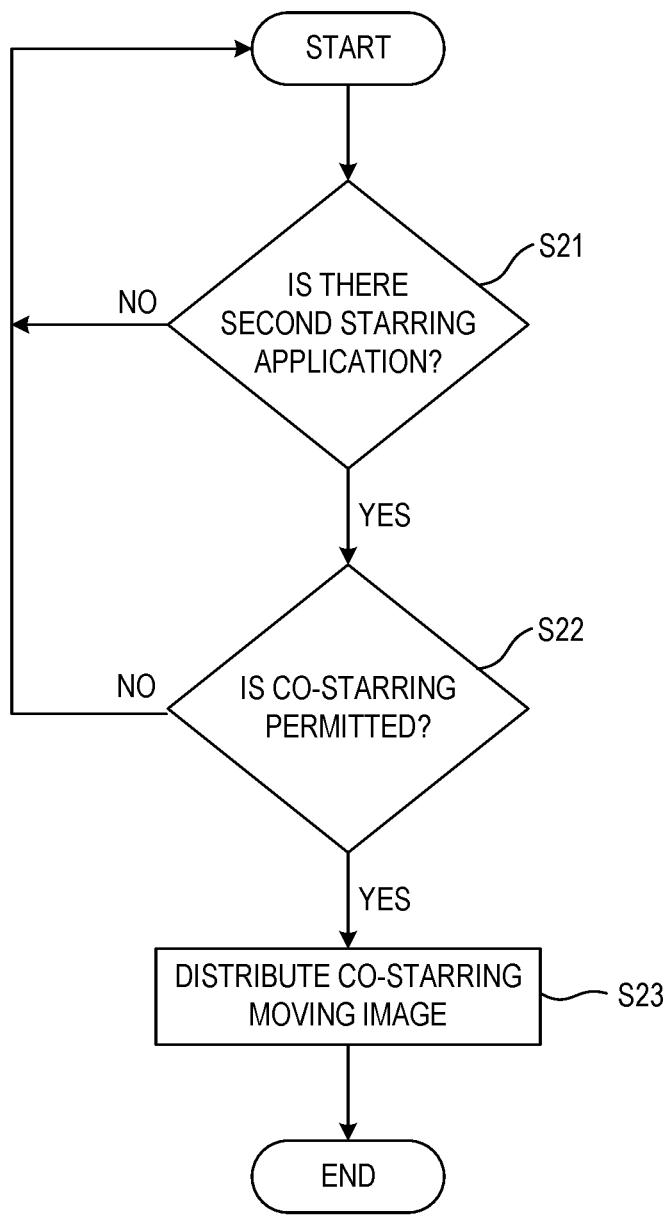
FIG. 14 is a flowchart illustrating the flow of a process of distributing the co-starring moving image based on a second co-starring application in one embodiment.

Next, a co-starring moving image distribution process based on the second co-starring application will be described with reference to FIG. 14. FIG. 14 is a flowchart illustrating the flow of the co-starring moving image distribution process in one embodiment. In the co-starring moving image distribution process described with reference to FIG. 14, it is assumed that the distribution user Ua that is viewing the moving image including the character object of the distribution user Ub makes a co-starring application to the distribution user Ub. The co-starring moving image distribution process illustrated in FIG. 14 may be performed in parallel to the moving image distribution process illustrated in FIG. 13.

First, it is determined in Step S21 whether or not the second co-starring application has been made by a user other than the distribution user Ub while the moving image including the character object of the distribution user Ub is being distributed. For example, the distribution user Ua makes the second co-starring application. In a case in which the distribution user Ua has made the second co-starring application, the process proceeds to Step S22.

In Step S22, it is determined whether or not to permit the second co-starring application from the distribution user Ua. For example, the co-starring of the distribution user Ua with the distribution user Ub is permitted in a case in which the distribution user Ub is notified that the distribution user Ua has made the co-starring application and permits co-starring with the distribution user Ua as a response to the notification. For example, the second co-starring application processing unit 61*d* determines whether or not to permit the co-starring application.

In a case in which it is determined in Step S22 that the co-starring application is permitted, the co-starring of the distribution user Ub (host user) and the distribution user Ua (guest user) is started, and the process proceeds to Step S23. In Step S23, the co-starring moving image in which the distribution user Ub and the distribution user Ua co-star is distributed. Specifically, in addition to the animation configuration data of the distribution user Ub, the animation configuration data of the distribution user Ua is transmitted to the viewing user device 10 and the distribution user device that are viewing the moving image of the distribution user Ub. The viewing user device 10 and the distribution user device that have received the animation configuration data can perform rendering based on the received animation configuration data to display a moving image including the character objects of the distribution user Ub and the distribution user Ua.

The operation and effect of the above-described embodiments will be described. In the one or more embodiments, a user that wants to co-star with another distribution user can make the first co-starring application, without specifying the co-starring partner, to co-star with the first co-starring user selected based on the first co-starring application. As described above, since it is possible to apply for co-starring without specifying the co-starring partner, the time and effort to search for the co-starring partner are reduced. Therefore, the co-starring of the users in the moving image is promoted.

In one or more of the embodiments of the invention, the distribution user that distributes the moving image can be registered as the first co-starrable user to receive the first co-starring application. Therefore, it is possible to provide the distribution user with a means for increasing the chance of co-starring with other users. On the other hand, when the distribution user is not registered as the first co-starrable user, it is possible to avoid the unexpected participation of the co-starring application user in his/her own moving image by the first co-starring application.

In one or more of the embodiments of the invention, a user can co-star with the first co-starring user only by making the first co-starring application, without getting the permission of the co-starring partner. Therefore, it is possible to co-star with other distribution users with a simpler process, as compared with the co-starring start process according to the related art in which co-starring can be performed only in a case in which the co-starring application is permitted. It can be considered that, since the first co-starring user is selected from the first co-starrable users, co-starring with the co-starring application user is permitted based on the registration as the first co-starrable user in a case in which the first co-starring application is received.

In one or more of the embodiments of the invention, even in a case in which a user does not view the moving image of the distribution user that is the co-starring partner, the user can make the first co-starring application. For example, when viewing a list of moving images being distributed, a user can open the setting window 41 and operate the switch 41*c* included in the setting window to make the first co-starring application. As described above, even when a user does not view the moving image of the distribution user that is the co-starring partner, the user can co-star with the distribution user. Therefore, it is possible to reduce the number of processes until the start of co-starring, as compared to the co-starring start process in which a user can only participate in the moving image that the user is viewing. As a result, the co-starring of users in the moving image is promoted.

In one or more of the embodiments of the invention, the upper limit of the number of users that can co-star with the distribution user is set. Therefore, it is possible to prevent an adverse effect caused by an excessive increase in the number of users that co-star in one moving image. For example, it is possible to prevent an excessive load on a process for participating in or leaving the co-starring moving image or a process for generating the co-starring moving image.

In one or more of the embodiments of the invention, it is possible to select, as the first co-starring user, a user that co-stars with the smallest number of users among the first co-starrable users based on the first co-starring application. This makes it easier to select, as the first co-starring user, a distribution user that co-stars with a small number of users or does not co-star with any user. Therefore, it is possible to preferentially provide an opportunity for co-starring with other users to the distribution user that does not actively co-star with other distribution users. Further, in one or more of the embodiments of the invention, it is possible to select, as the first co-starring user, a distribution user that can co-star with a large number of users (has a large number of co-starring frames) which is represented by the difference between the upper limit of the number of users that can co-star and the number of users that are actually co-starring. Therefore, it is possible to preferentially provide an opportunity for co-starring with other users to a distribution user that has a large number of co-starring frames.

In one or more of the embodiments of the invention, the first co-starring user may be selected from the first co-starrable users based on an algorithm that makes it easy to select, as the first co-starring user, a distribution user that can co-star with a small number of users (has a small number of co-starring frames). In this case, since a user that has already co-starred with other distribution users is easily selected as the first co-starring user, it is possible to make the co-starring application user participate in the moving image of the distribution user that has experience of co-starring with other distribution users.

In one or more of the embodiments of the invention, it is possible to select the first co-starring user from the first co-starrable users based on the user attribute information about the co-starring application user and the user attribute information of the first co-starrable users. For example, this makes it possible to select, as the first co-starring user, a user having a high degree of matching of the user attribute information with the co-starring application user from among the first co-starrable users. Therefore, even when a co-starring moving image is generated based on the first co-starring application that does not specify the co-starring partner, it is easy to find a common topic between the users that co-star.

In one or more of the embodiments of the invention, a co-starring applicant can make the second co-starring application that specifies the co-starring partner and can co-star with the co-starring partner specified in the second co-starring application in a case in which the co-starring is permitted based on the second co-starring application. It is assumed that the distribution user that does not want to co-star with the co-starring partner that is not permitted is not registered as the first co-starrable user. Therefore, when the moving image distribution system 1 provides only the co-starring function based on the first co-starring application that does not specify the co-starring partner, it is difficult to provide an opportunity for co-starring to the distribution user that does not want to co-star with the co-starring partner that is not permitted. The provision of the function of co-starring with the permitted co-starring partner makes it possible to provide an opportunity for co-starring with other users even to the distribution user that does not want to co-star with the co-starring partner that is not permitted.

In one or more of the embodiments of the invention, since the second co-starring application is made to the distribution user that is distributing the moving image being viewed, it is possible to receive the second co-starring application only from the co-starring application user that is interested in the moving image being distributed.

In one or more of the embodiments of the invention, a list of the distribution users that are distributing the moving images is displayed, and the first co-starrable user is displayed so as to be distinguishable from other distribution users in the list. For example, in the list of the moving images or the moving image distribution users displayed as "Recommended", a message indicating that co-starring is possible based on the first co-starring application, such as "co-starring frame 2" is displayed in association with an icon corresponding to the first co-starrable user (or the moving image distributed by the first co-starrable user). Therefore, the co-starring application user can check the distribution user that can be the co-starring partner before making the first co-starring application.

In one or more of the embodiments of the invention, a user that has started a game in which a plurality of distribution users participate (for example, a party game in which character objects participate) can be registered as the first co-starrable user. This makes it easy to select the user that has started the game as the first co-starring user based on the first co-starring application. Since the user that has started the game has a common topic of the game, it is possible to smoothly perform collaboration even when the users that do not have prior knowledge about each other co-star based on the first co-starring application.

In the processing procedures described in the specification, particularly, in the processing procedures described using the flowcharts, some of the steps constituting the processing procedures can be omitted, steps that are not specified as the steps constituting the processing procedures can be added, or the order of the steps can be changed. The processing procedures in which the steps have been omitted and added and the order of the steps has been changed are also included in the scope of the invention as long as they do not deviate from the gist of the invention.

At least some of the functions implemented by the computer processor 61 may be implemented by a computer processor other than the computer processor 61 in the moving image distribution system 1. At least some of the functions implemented by the computer processor 61 may be implemented by, for example, the computer processor 21 of the distribution user device 20 or the computer processor of the viewing user device 10.

In the above-described embodiments, the viewing user device 10 and the distribution user device for viewing the moving image perform rendering based on the animation configuration data to generate the moving image data of the moving image including the character object of the distribution user. That is, in the above-described embodiments, the moving image including the character object of the distribution user is generated by the viewing user device 10 or the distribution user device of the user that views the moving image. The rendering for generating the moving image may be performed by a device other than the viewing user device 10 or the distribution user device for viewing the moving image. For example, the server 60 may perform rendering for generating a moving image corresponding a viewing request and transmit the moving image data generated by the rendering to the viewing user device 10 or the distribution user device that has transmitted the viewing request. In this case, the viewing user device 10 and the distribution user device that have received the moving image data of the moving image to be viewed from the server 60 can output the received moving image data to the display or the speaker without performing rendering. The rendering of the moving image to be viewed may be performed by the distribution user device of the distribution user that distributes the moving image. In this case, the distribution user device of the distribution user that distributes the moving image performs the rendering, and the moving image data generated by the rendering is transmitted to the viewing user device 10 and the distribution user device, which have transmitted the request to view the moving image, through the server 60 or directly.

What is claimed is:

1. A moving image distribution system, comprising:
    one or more processors; and
    storage storing computer-readable instructions,
    wherein the one or more processors is configured to execute the instructions to perform operations comprising:
    registering a distribution user that has made a registration request among a plurality of distribution users that distribute moving images including character objects generated based on their own movements, as a first co-starrable user,
    displaying a plurality of first co-starrable users and a setting button to display a setting window including co-starring operator items including a switch for turning on and off a registration flag to indicate that the distribution user is the first co-starrable user,
    selecting a first co-starring user from among the plurality of first co-starrable users in response to reception of a first co-starring application for co-starring with any of the plurality of first co-starrable users from a co-starring application user,
    distributing a co-starring moving image in which the co-starring application user and the first co-starring user co-star,
    wherein an upper limit of a number of users able to co-star is set for each of the plurality of distribution users,
    wherein a list including at least some of the plurality of distribution users is displayed, and
    in the list, each of the one or more first co-starrable users is displayed so as to be distinguishable from the distribution user that is not the first co-starrable user among the plurality of distribution users,
    wherein a message indicating a co-starring frame information is displayed in association with an icon corresponding to each of the one or more first co-starrable users, and
    wherein the co-starring frame information is represented by a difference between the upper limit and a number of users that are co-starring.

2. The moving image distribution system according to claim 1,
    wherein the co-starring moving image is distributed without getting permission of the first co-starring user after the first co-starring application is received.

3. The moving image distribution system according to claim 1,
    wherein the first co-starring application is received both while the co-starring application user is viewing the moving image of the first co-starring user and while the co-starring application user is not viewing the moving image of the first co-starring user.

4. The moving image distribution system according to claim 1,
    wherein a number of co-starrable users represented by a difference between the upper limit and a number of users that are co-starring is managed for each of the plurality of distribution users, and
    the first co-starring user is selected based on the number of the co-starrable users for each of the plurality of distribution users.

5. The moving image distribution system according to claim 1,
    wherein attribute information indicating an attribute of each of the plurality of distribution users is set, and
    the first co-starring user is selected at least based on the attribute information about the first co-starrable users.

6. The moving image distribution system according to claim 1,
    wherein determination is made whether the co-starring application user and a second co-starring user selected from the plurality of distribution users are able to co-star in response to reception of a second co-starring application for co-starring with the second co-starring user selected from among the plurality of distribution users, and
    in a case in which it is determined that the co-starring application user and the second co-starring user are able to co-star, another co-starring moving image in which the co-starring application user and the second co-starring user co-star is generated.

7. The moving image distribution system according to claim 6,
    wherein the second co-starring application is received only while the co-starring application user is viewing the moving image of the second co-starring user.

8. The moving image distribution system according to claim 6,
    wherein the second co-starring user is selected from one or more second co-starrable users that receive the second co-starring application among the plurality of distribution users, and
    a co-starring list including at least one of at least some of one or more first co-starrable users and at least some of the second co-starrable users that receive the co-starring application among the plurality of distribution users is provided to the co-starring application user.

9. The moving image distribution system according to claim 1,
    wherein a user that has started a game in which at least some of the plurality of distribution users participate is registered as the first co-starrable user.

10. A moving image distribution method performed by execution of a computer-readable command by one or more computer processors, the moving image distribution method comprising:
    registering a distribution user that has made a registration request among a plurality of distribution users that distribute moving images including character objects generated based on their own movements, as a first co-starrable user;
    displaying a plurality of first co-starrable users and a setting button to display a setting window including co-starring operator items including a switch for turning on and off a registration flag to indicate that the distribution user is the first co-starrable user;
    selecting a first co-starring user from among the plurality of first co-starrable users in response to reception of a first co-starring application for co-starring with any of the plurality of first co-starrable users from a co-starring application user;
    generating a co-starring moving image in which the co-starring application user and the first co-starring user co-star,
    wherein an upper limit of a number of users able to co-star is set for each of the plurality of distribution users,
    wherein a list including at least some of the plurality of distribution users is displayed, and
    in the list, each of the one or more first co-starrable users is displayed so as to be distinguishable from the distribution user that is not the first co-starrable user among the plurality of distribution users, wherein a message indicating a co-starring frame information is displayed in association with an icon corresponding to each of the one or more first co-starrable users, and wherein the co-starring frame information is represented by a difference between the upper limit and a number of users that are co-starring.

* * * * *